US011754836B2

(12) United States Patent
Peng et al.

(10) Patent No.: US 11,754,836 B2
(45) Date of Patent: *Sep. 12, 2023

(54) OPTICAL SYSTEM FOR AR HEADSETS, AND METHOD FOR DESIGN AND MANUFACTURING

(71) Applicant: AURORATECH COMPANY, Burlingame, CA (US)

(72) Inventors: Ziqi Peng, Burlingame, CA (US); Don Dilworth, East Boothbay, ME (US)

(73) Assignee: AURORATECH COMPANY, Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,666

(22) Filed: Dec. 3, 2021

(65) Prior Publication Data

US 2022/0091416 A1    Mar. 24, 2022

Related U.S. Application Data

(63) Continuation of application No. 16/708,424, filed on Dec. 9, 2019, now Pat. No. 11,221,483.

(60) Provisional application No. 62/777,689, filed on Dec. 10, 2018.

(51) Int. Cl.
*G02B 27/01* (2006.01)

(52) U.S. Cl.
CPC .. *G02B 27/0101* (2013.01); *G02B 2027/0123* (2013.01); *G02B 2027/0178* (2013.01)

(58) Field of Classification Search
CPC .. H04N 13/286; H04N 13/344; H04N 13/361; H04N 13/363; H04N 13/366; G03B 21/006; G03B 21/008; G03B 21/28; G03B 21/145; G03B 21/208; G03B 21/2013; G03B 21/2033; G03B 21/2053; G03B 21/2066; G02B 2027/013; G02B 2027/0123; G02B 2027/0127; G02B 2027/0141; G02B 2027/0178; G02B 2027/0187; G02B 27/01; G02B 27/0101; G02B 27/0172; G02B 27/0179; G02B 27/141; G02B 27/283; G02B 27/1033

See application file for complete search history.

(56) References Cited

U.S. PATENT DOCUMENTS

| 9,632,312 | B1 * | 4/2017 | Cakmakci | G02B 27/0172 |
| 10,514,544 | B1 * | 12/2019 | Yoon | G02B 27/017 |
| 2010/0157400 | A1 * | 6/2010 | Dimov | G02B 27/0172 359/13 |
| 2014/0361957 | A1 * | 12/2014 | Hua | G02B 27/0172 345/8 |

(Continued)

*Primary Examiner* — Sultan Chowdhury
(74) *Attorney, Agent, or Firm* — Smith Tempel Blaha LLC; Gregory Scott Smith

(57) ABSTRACT

A projection augmented reality headset (ARHS), providing a wide field-of-view and an optimized eye relief. THE ARHS includes a projection having an imager and imaging optics which provides image light to a partially reflecting combiner. Further, the partially reflecting combiner configured to receive the image light, and is configured to re-direct the image light towards an eyebox, with an eye relief offset between the partially reflecting combiner and the eyebox. As such, the imaging optics include a combination of lens elements having symmetrical or free-form lens surfaces that are tilted and decentered to expand a field-of-view.

20 Claims, 24 Drawing Sheets

(56) References Cited

U.S. PATENT DOCUMENTS

| | | | |
|---|---|---|---|
| 2017/0115489 A1* | 4/2017 | Hu | G06T 19/006 |
| 2019/0179149 A1* | 6/2019 | Curtis | G02B 6/0076 |
| 2020/0174255 A1* | 6/2020 | Hollands | G02B 27/0172 |
| 2020/0183158 A1 | 6/2020 | Peng et al. | |

* cited by examiner

OPTICAL SYSTEM FOR AR HEADSETS, AND METHOD FOR DESIGN AND MANUFACTURING

CROSS-REFERENCE TO RELATED APPLICATIONS

This application is being filed in the United States Patent Office as a continuation application of U.S. patent application Ser. No. 16/708,424, filed on Dec. 9, 2019 and bearing the same title, which application claims the benefit of U.S. Provisional Application Ser. No. 62777689 filed on Dec. 12, 2018. Each of these applications are incorporated herein by reference in their entirety.

BACKGROUND

As computer technology is migrating in sophistication, complexity, power and realism, one could say that the ultimate goal is to create a computerized human being. As this process is unfolding before our eyes, the humans are not sitting idly by just watching, but rather, they are also taking steps toward entering a computerized world. We have seen this in the distance past with the creation of the Six Million Dollar Man as well as the migration of Sci-Fi movies like the Matrix and Ready Player One. Maybe someday we will live in a world where the computer and mankind are fully joined but, in the meantime, the human venture into the computer world is being played out in the virtual reality and augmented reality technologies.

Virtual reality (VR) is an interactive computer-generated experience taking place within a simulated environment. This simulates environment often include audio and visual elements, as well as other elements such as sensory feedback (vibrations, motion, smells, temperature, and other sensory feedback like haptic.

Haptic is relating to the sense of touch, and in particular, relating to the perception and manipulation of objects using the senses of touch and proprioception. Haptic perception refers to the ability "to grasp something". This is typically achieved through the active exploration of surfaces and objects by a moving subject, as opposed to passive contact by a static subject during tactile perception. The term Haptic was coined by the German Psychologist Max Dessoir in 1892, when suggesting a name for academic research into the sense of touch in the style of that in "acoustics" and "optics".

Haptic technology or kinesthetic communication recreates the sense of touch by applying forces, vibrations, or motions to the user. This mechanical stimulation can be used to assist in the creation of virtual objects in a computer simulation, to control such virtual objects, and to enhance the remote control of machines and devices (telerobotics). Haptic devices may incorporate tactile sensors that measure forces exerted by the user on the interface as well as accelerometers to detect motion.

In general, there are three sensory systems related to sense of touch in humans: cutaneous, kinesthetic and haptic. All perceptions mediated by cutaneous and/or kinesthetic sensibility are referred to as tactual perception. The sense of touch may be classified as passive and active, and the term "haptic" is often associated with active touch to communicate or recognize objects.

This VR immersive environment can be similar to the real world or it can be fantastical, creating an experience that is not possible in ordinary physical reality.

Augmented reality (AR) systems may also be considered a form of VR. The main difference between AR and VR is that AR that layers virtual information over a live camera feed or actual visualization of one's environment with the eye giving the user the ability to view three-dimensional images integrated into his or her real world.

Presently, the migration of AR is plagued with limitations. Some of these limitations include the cost of the equipment, the size, bulkiness or weight of the equipment and the limited functionality of the equipment. Looking at this latter limitation, the field-of-view (FOV) allows for visual coverage of an area rather than a single focused point. The larger the FOV is within a VR or AR, the more immersed a user feels.

In human vision, the field-of-view is composed of two monocular FOVs which joined seamlessly together in our brains as one binocular FOV. Individually, our eyes have a horizontal FOV of about 135 degrees and a vertical FOV of just over 180 degrees, however this can vary greatly depending on an individual's facial structure. As such, the human field of vision can be as much as 210 degrees in some cases. For instance, the size of one's nose, cheeks, depth of eye sockets, etc. When the monocular fields of view are stitched together, our binocular FOV gives us around 114 degrees of view horizontally and is necessary for depth perception. Our peripheral vision makes up the remaining 60-70 degrees and has only monocular vision because only one eye can see 3 those sections of the visual field. In typically VR and AR systems, the FOV is greatly limited. For instance, in the MAGIC LEAP ONE product, the horizontal FoV value identified as 40 degrees, vertical 30 degrees, and diagonal of 50 degrees. This is about one-third larger than that of Microsoft's HoloLens.

This limited FOV can adversely impact the user experience and, in commercial or military settings, can greatly impact the performance that a user can achieve when using AR. Thus, there is a need in the art for a technology that can be used in an AR environment that provides a much wider FOV.

SUMMARY

The present disclosure is related to augmented reality headsets and more particularly, free space augmented reality (AR) display that include an image source and imaging optics. The imaging options provide an image light. The AR display also includes imaging optics which consist of diffractive, kinoform, Fresel, spherical, and aspherical elements which serve to magnify the image source, as well as an aspherical, conic, or freeform combiner which serves to relay the image light into the wearer's eyes. The relay optics and combiner are optimized together using a computer-aided automatic process to satisfy certain resolution and size metrics. A projection augmented reality headset (ARHS), providing a wide field-of-view and an optimized eye relief. THE ARHS includes a projection having an imager and imaging optics which provides image light to a partially reflecting combiner. Further, the partially reflecting combiner configured to receive the image light, and is configured to re-direct the image light towards an eyebox, with an eye relief offset between the partially reflecting combiner and the eyebox. As such, the imaging optics include a combination of lens elements having symmetrical or free-form lens surfaces that are tilted and decentered to expand a field-of-view. One embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view. In some embodiments, the partially reflecting combiner is at least 20 mm, but no more than 40 mm, from the wearer's eye. Another embodiment is a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the field-of-view is at least 65 degrees horizontally per eye. In some embodiments the eyebox is at least 10 mm wide horizontally and vertically. In another embodiment a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the partially reflecting combiner is at least 20 mm, but no more than 40 mm, from the wearer's eye, and wherein the partially reflecting combiner comprises a rear surface, which is a partially reflective spherical, conic, aspheric, or freeform surface, and a front surface, which is a transmissive spherical, conic, aspheric, or freeform surface. Another embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the partially reflecting combiner is at least 20 mm, but no more than 40 mm, from the wearer's eye, and wherein a partially reflective coated front surface, and the transmissive rear surface may be used together as a Magnin mirror to correct aberrations. In some embodiments the combiner may consist of two cemented elements with a partially reflective second surface. Yet another embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the imaging optics include a combination of spherical, aspherical, and free-form lens surfaces fabricated from plastic or glass. In some embodiments, the elements described can be tilted or decentered to reduce the peak width of the headset to no more than 220 mm. In some embodiments Fresnel, diffractive or kinoform elements may be used to further reduce the size of the system. In some embodiments diffractive or kinoform elements may be used to compensate for dispersion created by refractive elements. Another embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the imager has a pixel pitch between 0.5 and 15 micrometers. In some embodiments the maximum linear dimension of the imager is between 0.1 and 3.5 inches. Another embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the modulation transfer function ("MTF") does not fall below thresholds related to the pixel pitch of the imager across the field-of-view and the eyebox. In another embodiment a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the refractive elements in the imaging optics are injection-molded, ground, or machined from materials compatible with such processes, the aspheric refractive elements are injection-molded or polished using a magnetorheological finishing process from materials compatible with such processes, the diffractive, kinoform, or Fresnel elements are embossed or single-point machined from materials compatible with such processes, and the combiner is formed or injection-molded from materials compatible with such processes. Yet another embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the imaging optics and combiner are generated, optimized, and toleranced together using a computer-aided automatic process and a single system of constraints. Another embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein the longitudinal chromatic aberration is sufficiently low such that the photopically-weighted polychromatic MTF does not fall below thresholds related to the pixel pitch of the imager. Another embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein software-based corrections are used to improve the image quality of the display by compensating for blur, distortion, and lateral chromatic aberration. Another embodiment includes a projection augmented reality headset (ARHS), providing a wide field-of-view and an optimized eye relief, comprising; a projection ARHS having an imager and imaging optics which provides image light to a partially reflecting combiner; the partially reflecting combiner configured to receive the image light, and is configured to re-direct the image light towards an eyebox, with an eye relief offset between the partially reflecting combiner and the eyebox; wherein the imaging optics include a combination of lens elements having symmetrical or free-form lens surfaces that are tilted and decentered to expand a field-of-view, wherein software-based adjustments are used to improve the comfort and quality for the user by adjusting color and brightness according to image content and environmental conditions.

DETAILED DESCRIPTION OF EXEMPLARY EMBODIMENTS

The present invention, as well as features and aspects thereof, are directed towards providing an optical solution the provides an ultra-wide field-of-view for VR and AR systems and/or headsets.

The various embodiments of the present invention provide the presentment of virtual images to be integrated into a real-world image and can be incorporated into devices such as an AR headset.

A virtual image is an image that, from the user's perspective, is not projected on a screen but rather appears to be present in space. Thus, in an AR system, virtual images are generated to give the appearance of existing in the user's real-world space.

A good tutorial of this field of art can be found in the United States published patent application US20100290127A1, which is summarized in the next few paragraphs.

A virtual image is different from a real image and the images are formed differently as well. A real image is an actual image that can be observed directly by the unaided human eye. A real image is present in the real world and the image is perceived by the human eye when light bouncing off of the image enters into the eye through the pupil and lands on the retina wall within the eye. Thus, a real image is a perception of a physically existing object at a given location. An example of a real image is a photograph. Real images can be created electronically through devices such as cathode ray tubes (CRT), liquid crystal displays (LCD) screens and organic light emitting diode OLED displays. The OLED is an example of an electronic display that provides a real image. The size of the display surface limits the size of the real image that can be provided to the observer.

Virtual image displays provide an image that is not observable on a physically existing viewing surface or in a tangible world. The virtual image is formed at a location in space where no display surface exists. An example of creating a virtual image is when someone looks at small items through a magnifying glass. The magnifying glass makes the image appear larger and the image also appears to be located substantially behind the surface where the item exists. Thus, while the item is a real image, the magnification of the item is a virtual image. By definition, a virtual image can exist at a location where no display surface exists. The size of the virtual image therefore is not limited by the size of a display surface. Virtual image electronic displays thus have the advantage of eliminating the need for a large display surface to produce a large electronic image.

Figure 1:
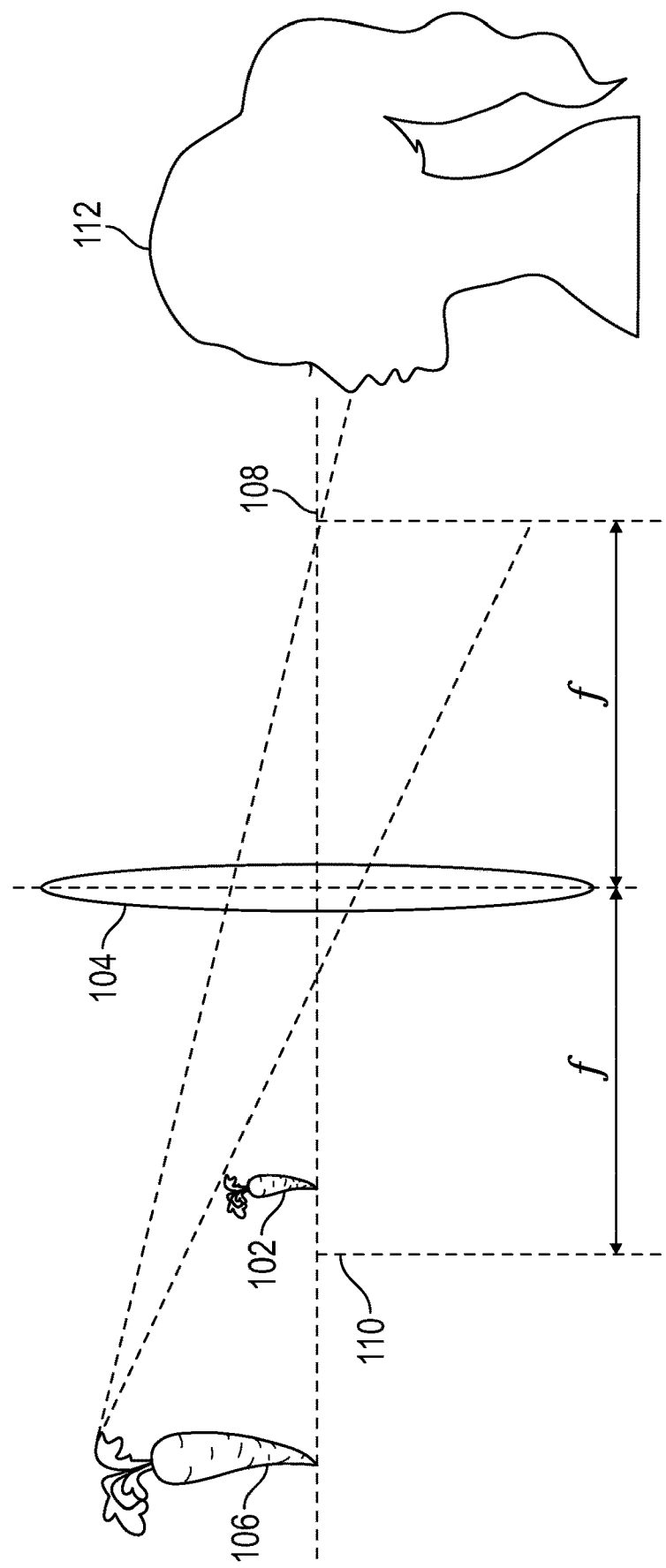
FIG. 1 depicts the concept of virtual images.

FIG. 1 illustrates how a virtual image can be created by viewing an object 102 through a magnifying lens 104. The object 102 is placed within the focal length f of a magnifying lens 104. The virtual image 106 that is formed appears to the viewer at point 108 and is enlarged and has the same orientation as the source object 102. As a result of this type of image formation, the size of the virtual image 106, as perceived by the viewer 112, is limited by the magnification of the display system as opposed to the size of the electronic display. This enables virtual image displays to be designed that provide the same amount of information per screen as real image displays yet occupy a smaller space.

Thus, it can be appreciated that an optical system can be used to create a virtual image. As such, the eye and the viewing surface properties of a real image are the factors that determine the viewing parameters, whereas in a virtual image display, the optical system determines most of the viewing parameters.

In the creation of an AR environment, especially one that is created through the use of a viewing headset, there is a limited surface area on which to provide a real image and limited space for viewing distance. In an AR headset (ARHS), a real image that serves as the source object is first formed by an imaging component that is electronically energized to form an image from image data. In embodiments of the present invention, an OLED or other emissive display device is utilized to create a real image and then, a virtual image is then created through an optical system. Obviously, within an ARHS, the imaging source needs to be small and inexpensive to reduce the size and overall cost of the ARHS. But it should be understood that while OLEDs can be utilized, other image sources may also be utilized, such as LCDs, etc. The optic system then forms a virtual image of the real image generated by the source, or OLED in the described embodiments. The virtual image is then seen by the viewer along with the actual real world in which they are located.

In creating an AR environment, such as through the use of an ARHS, the field-of-view that is available to the viewer is of paramount importance. The full field-of-view is defined as the ratio of the largest apparent dimension of the virtual image to the apparent distance to the virtual image. This is generally equivalent to the field-of-view for a real image display surface. In the system illustrated in FIG. 1, a wide field-of-view requires a large aperture through which the image is viewed to have a comfortable eye relief, that is, the distance between the display and the eye. It can thus be appreciated that within the confines of an ARHS, it can be exceedingly difficult to achieve a large FOV.

The FOV can be determined by the following formula:

FOV (degrees)=2 tan−1 (S/2f), where S is the size of the source image and f is the focal length of the optics. Based on this relationship, the size of the field can be increased by either providing a larger source image S to optic system or providing a shorter focal length f.

Figure 2:
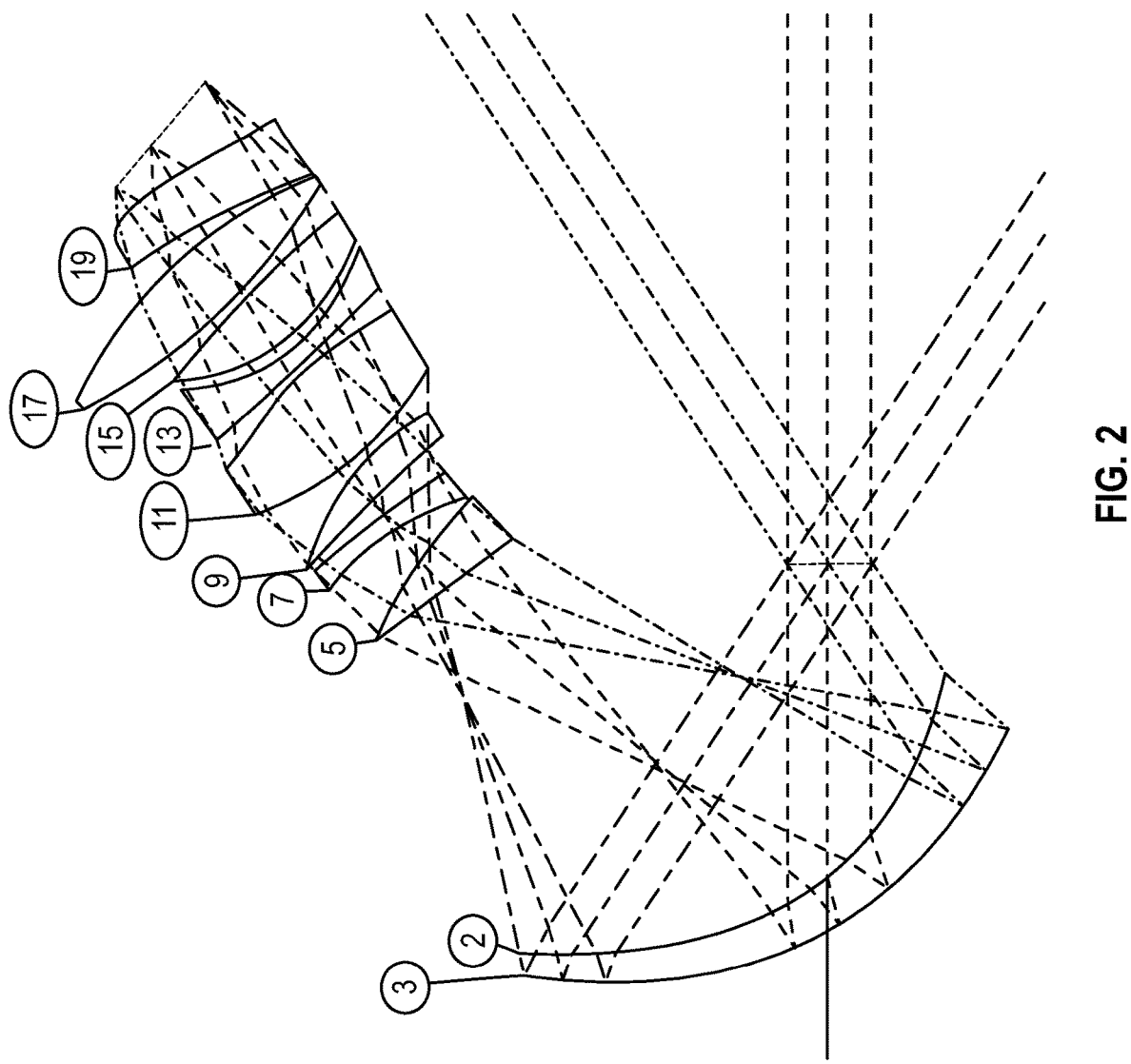
FIG. 2 depicts an ARHS optical system with a microdisplay and a large field-of-view.

FIG. 2 is an optic system that can be utilized to create a large field-of-view. An image source 200, such as a micro OLED, is used to create the real image. The optical system includes a series of stacked lenses 19, 17, 15, 13, 11, 9, 7 and 5 that operate to expand the FOV of the virtual image that can be viewed at the ARHS eye screen 2.

Figure 3:
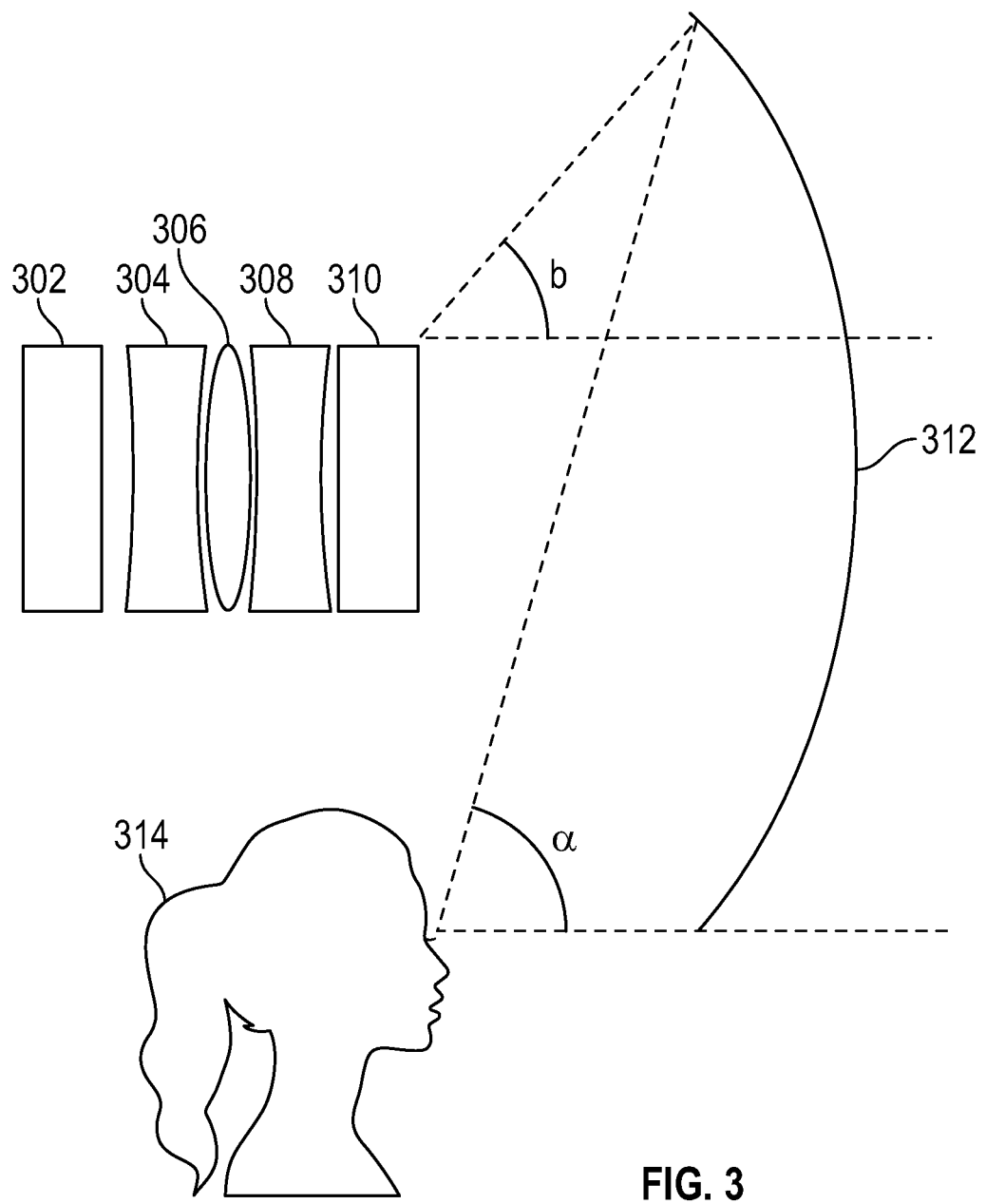
FIG. 3 depicts another optical system that can be used in various embodiments.

FIG. 3 is another optical system that can be used in various embodiments. In this embodiment, a micro OLED 302 is used to create the real image. The light passes through the optical system constructed of a concave lens 304, convex lens 306, concave lens 308 and glass 310 to create a virtual image that is reflected through and 6 off of the optical viewer 312. The user 314 can then view through the optical viewer 312 to see their real-world environment with virtual images being interjected therein. With the optical system constructed as such, the FOV of the device can be as much as 130-140 degrees.

The real image available from the micro OLED 602 is on the order of 5-20 degrees. As the light passes through diffractive lens 604 the field-of-view is expanded as light near the edges of the diffractive lens, or concave lens are bent more thus diverting the light from the center axis. The light then passes through the convex lens 606 in which the light in the center is slowed down and the light on the outer edges is directed towards the center axis.

This light then enters the Fresnel-diffractive lens 608 where the light is spread out even further and directing it through glass 610 towards the viewing glasses 612. At the angle that the light exits the glass cover 610 and the distance to the viewing glasses 612, the wide FOV is able to be achieved. This is true in the horizontal plane and the vertical plane.

It should be understood that in such a configuration, it is important to block out environment light to avoid the creation of the rainbow effect. However, by blocking out the environmental light, it inhibits the viewing of the real-world environment. As such, the optical systems as shown in FIG. 2 and FIG. 3 can utilize a Fresnel Lens to help counteract the rainbow effect without blocking out the environmental light.

Fresnel lenses consist of a series of concentric grooves etched into the lens surface. Their thin, lightweight construction, availability in small as well as large sizes, and excellent light gathering ability make them useful in a variety of applications. Fresnel lenses are most often used in light gathering applications, such as condenser systems or emitter/detector setups. They can also be used as magnifiers or projection lenses in illumination systems, and image formulation.

A Fresnel lens replaces the curved surface of a conventional optical lens with a series of concentric grooves. These contours act as individual refracting surfaces, bending parallel light rays to a common focal length. As a result, a Fresnel lens, while physically narrow in profile, is capable of focusing light similar to a conventional optical lens but has several advantages over its thicker counterpart.

For starters, Fresnel lenses improve the eye-relief, which is distance from the eye at which the optical system can be held, with the eye still capable of viewing the entire virtual image. Optical devices that provide a short eye relief are undesirable due to the inconvenience and discomfort associated with placing the eye in close proximity with the optic.

It is therefore generally preferred that an optical system provides an eye relief of more than 20 mm to enable the magnified image to be viewed through the optic at a comfortable and convenient range of distances from the optic and to allow viewing by a person who wears eyeglasses.

In addition, the Fresnel lens advantageously increases the "eyebox", which is the space within which the eye can move such as the transverse distance that the eye can move with respect to the optical system and over which the eye can still see the entire virtual image through the optical system. The Fresnel lens is built on the principle that the direction of propagation of light does not change within a medium (unless scattered). Instead, light rays are only deviated at the surfaces of a medium. As a result, the bulk of the material in the center of a lens serves only to increase the amount of weight and absorption within the system. Utilizing the Fresnel lens thus advantageously reduces the size and weight of the optical system. Fresnel lenses are a type of lens that eliminates the bulk of a conventional lens by collapsing the lens thickness while retaining the curvature necessary for focusing.

Figure 4:
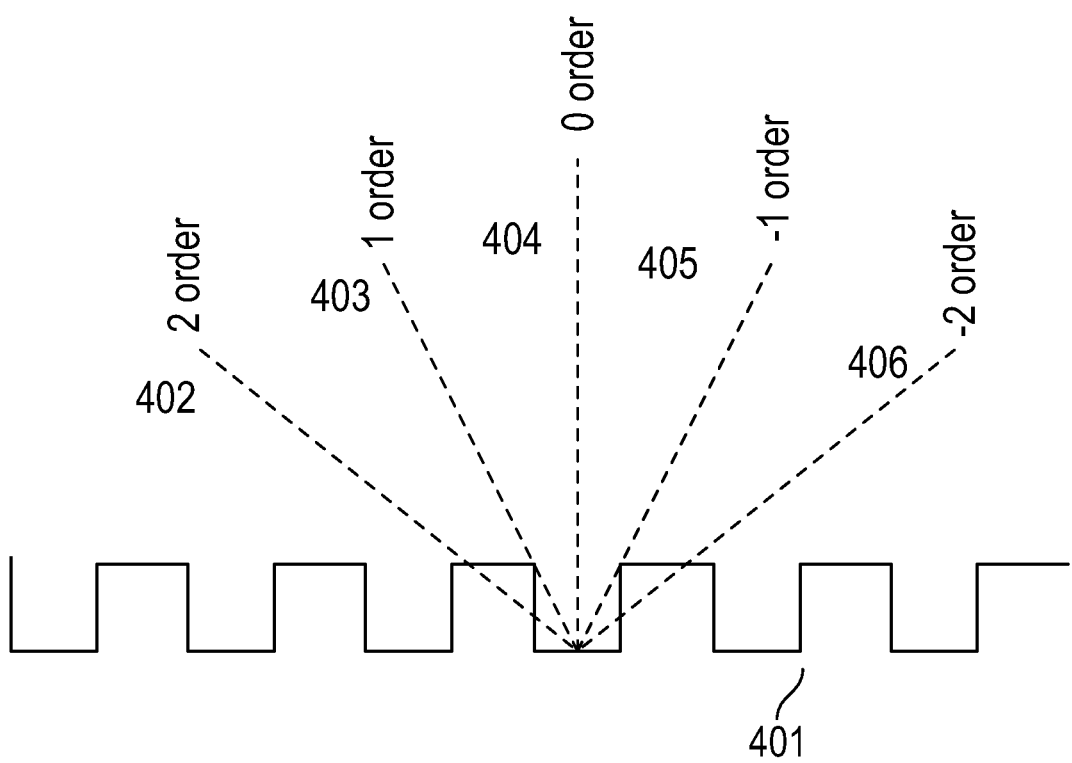
FIG. 4 depicts light passing through a Fresnel lens.

A Fresnel lens can be combined with a diffractive optical element to reduce chromatic aberrations caused by the Fresnel lens. As RGB light transits at different angles, passing through a Fresnel creates a chromatic aberration. However, placing the Fresnel lens on a diffractive optic element cancels out the chromatic aberration of RGB lights transmitting at different angles. FIG. 4 illustrates the effect of light passing through a diffractive optic element generating diffractive orders 402, 403, 404, 405, 406. It should be appreciated that while the illustrated example shows the contour 401 created in a square-wave manner, any of a wide variety of shapes can be used including saw tooth, curved saw-tooth, etc. As such, the Fresnel lens can be aspherical, spherical, free form, etc.

Figure 5:
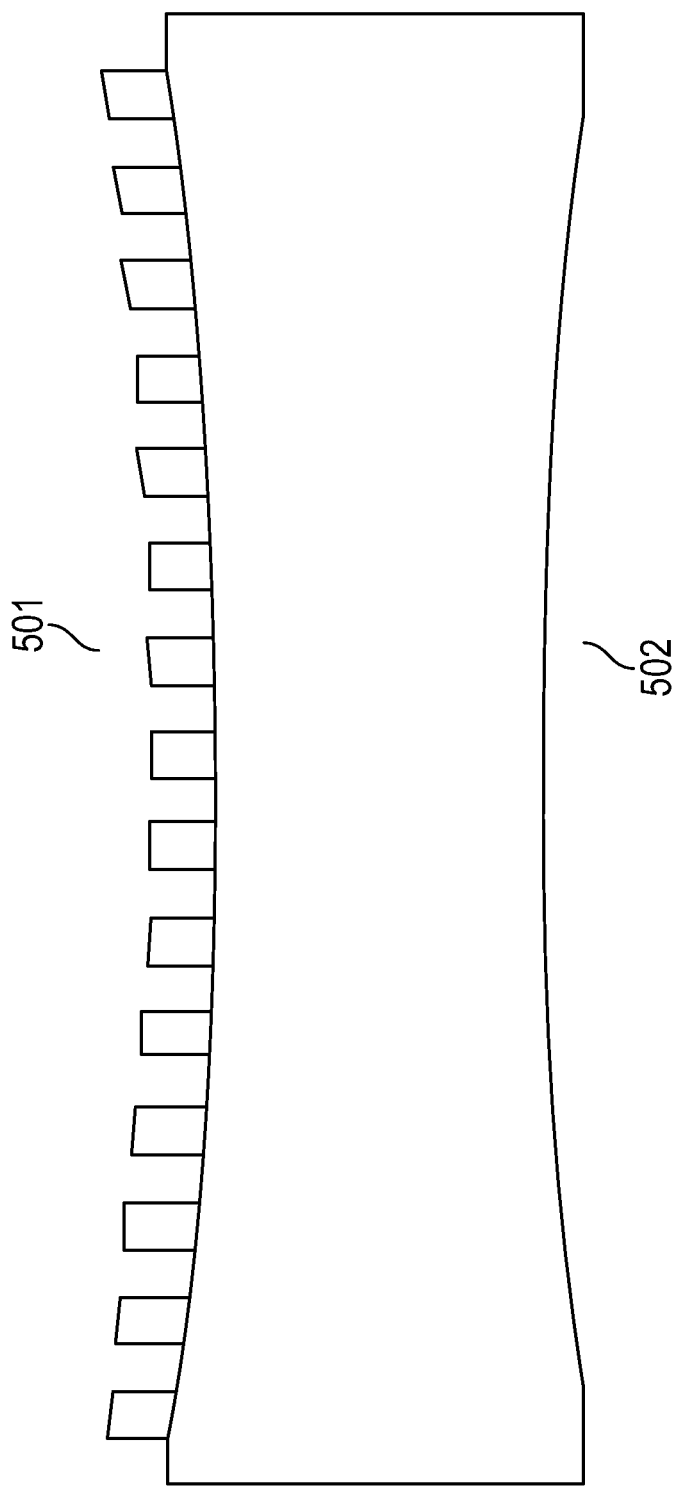
FIG. 5 depicts a diffractive optical element with a Fresnel lens.

FIG. 5 illustrates a diffractive optical element 501 including a Fresnel lens 502 incorporated therein.

Figure 6:
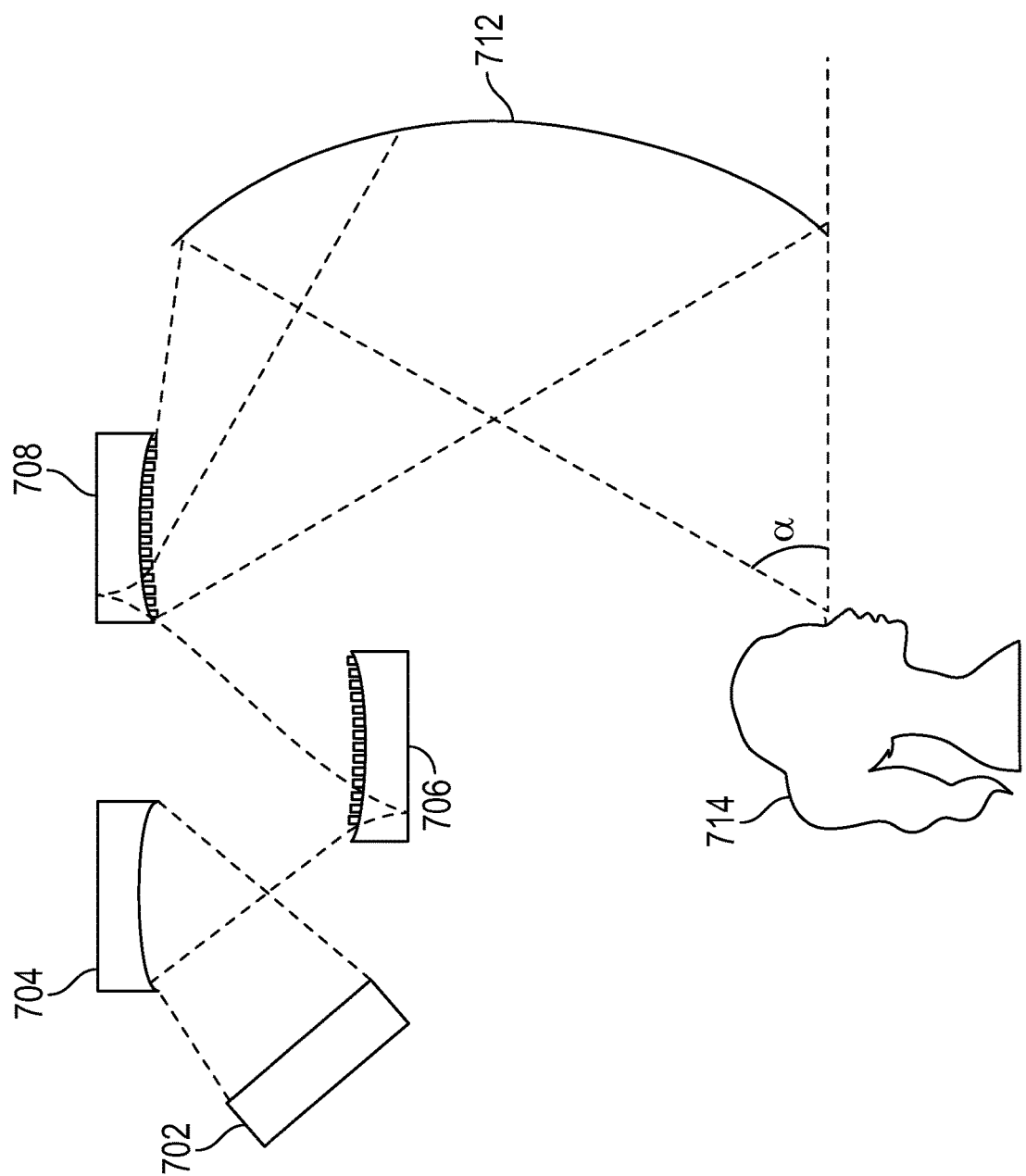
FIG. 6 depicts an ARHS optical system using a Fresnel/diffractive optical element.

FIG. 6 illustrates the use of a Fresnel lens combined with a diffractive optical element 610 within the optical system illustrated in FIG. 3.

Figure 7:
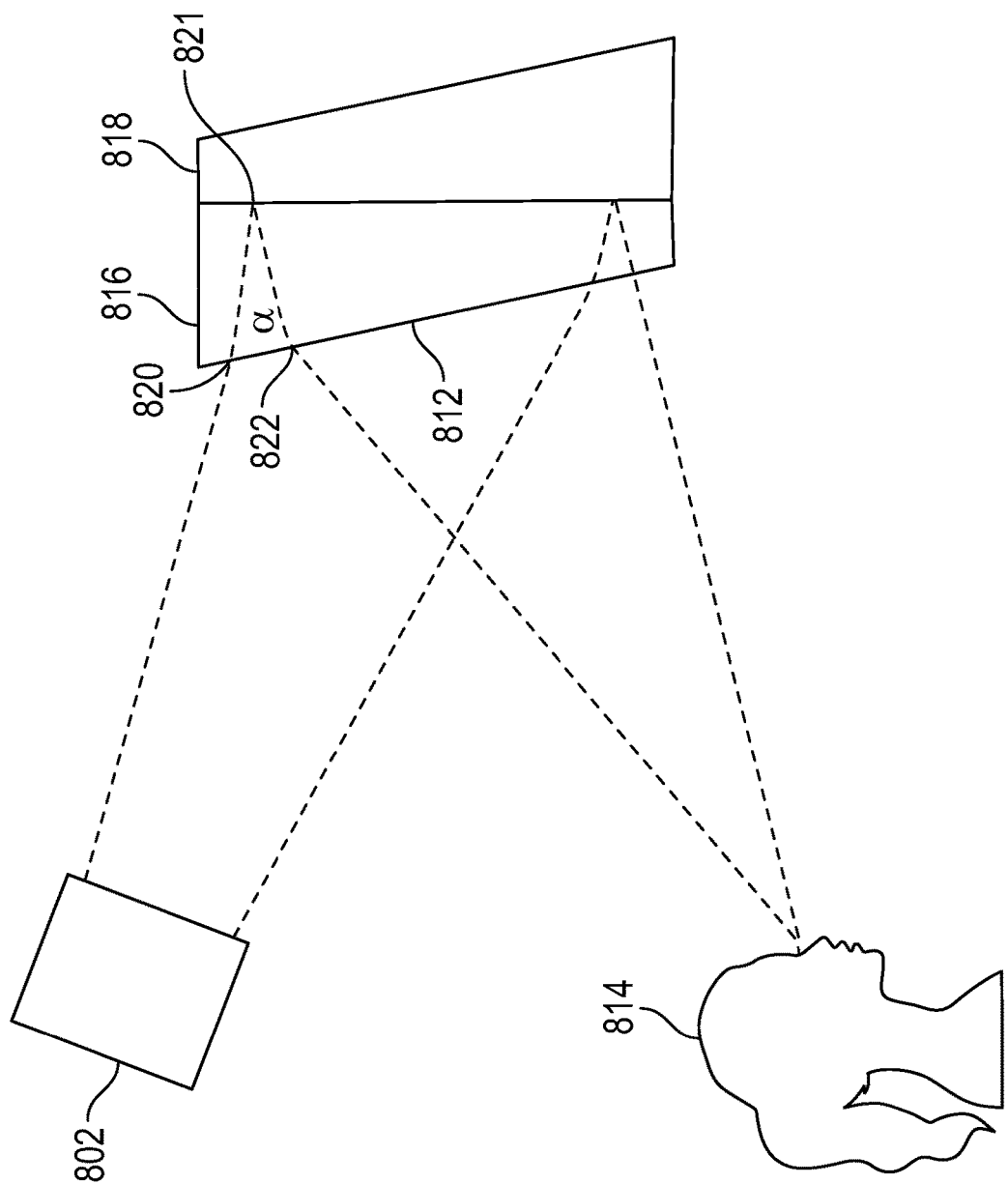
FIG. 7 depicts an ARHS optical system using several Fresnel/diffractive optical elements.

FIG. 7 illustrates another embodiment of an optical system that can achieve a wide FOV from a source, such as a micro OLED 702. Here, the real image is created again by the micro OLED 702. As the light passes through the optical system of lens 704, Fresnel lens 702 and Fresnel lens 708, the virtual image is then visible through glasses 712 by a viewer 714.

Fresnel lenses are intended as purely refractive lenses. A kinoform lens combines refractive and diffractive properties of Fresnel lenses and zone plates to produce an efficient diffractive lens that can focus as well as cancel chromatic aberration. Thus, the combined Fresnel lens and kinoform lens can be included in the optic system.

Figure 8:
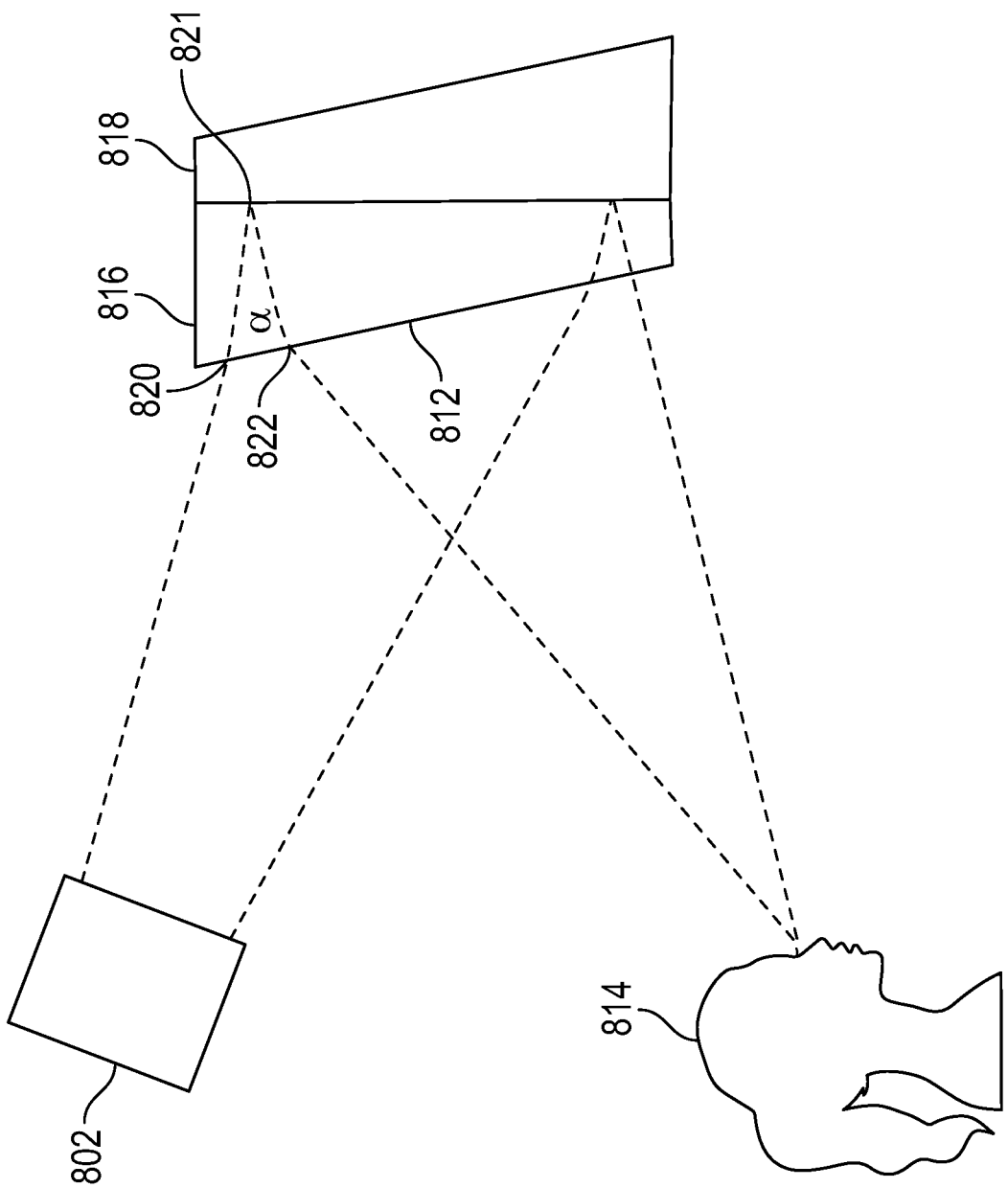
FIG. 8 depicts an ARHS optical system with a Magnin mirror.

In some embodiments, a Mangin Mirror lens can be used for the viewing glasses. FIG. 8 is an illustration of the optics use for this element. Here, the real image from the micro OLED and the optics system 802 travels to the surface of the viewing glasses 812. The viewing glasses 812 includes a Mangin Mirror lens 816 adjoined to another lens 818. As the light passes through the surface of the viewing glasses 812, it bends upwards due to refraction. When the light hits that back of the Mangin Mirror lens 816, it is reflected and angle a. As the light again passes through the surface of the viewing glasses 812, it is refracted again. This structure provides the advantage of three points at which the light hits 820, 821 and 822. The illustrated Mangin Mirror has a flat surface, however, it should be appreciated that curved surfaces may also be utilized.

Figure 9:
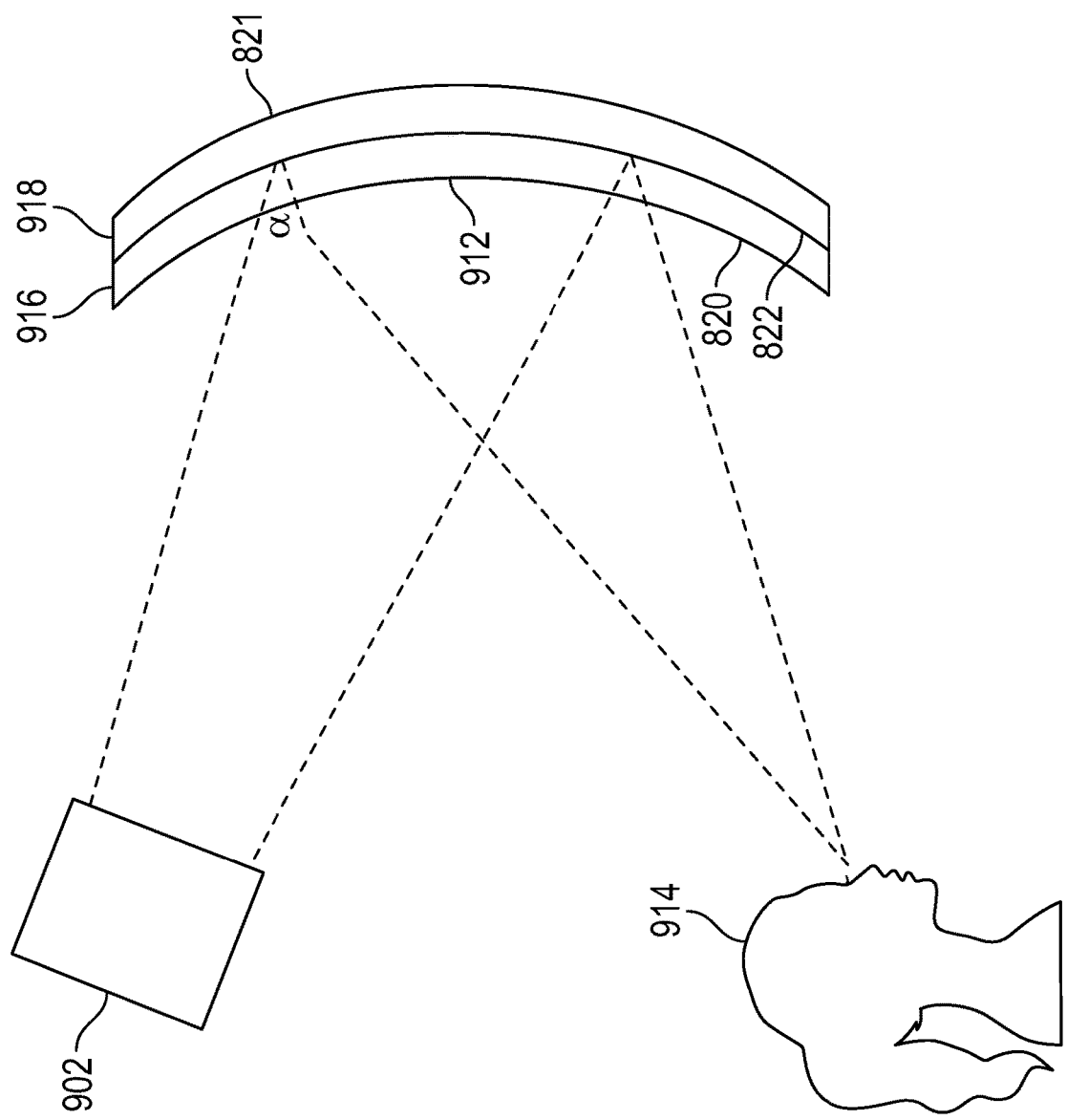
FIG. 9 depicts an ARHS optical system with a curved Magnin mirror.

FIG. 9 is another illustration of the Mangin Mirror with curved lenses. Here the visor 912 includes a Mangin Mirror 916 that is glued to another lens 918. The light rays hit three surfaces 820 twice, 822 and 821.

Figure 10:
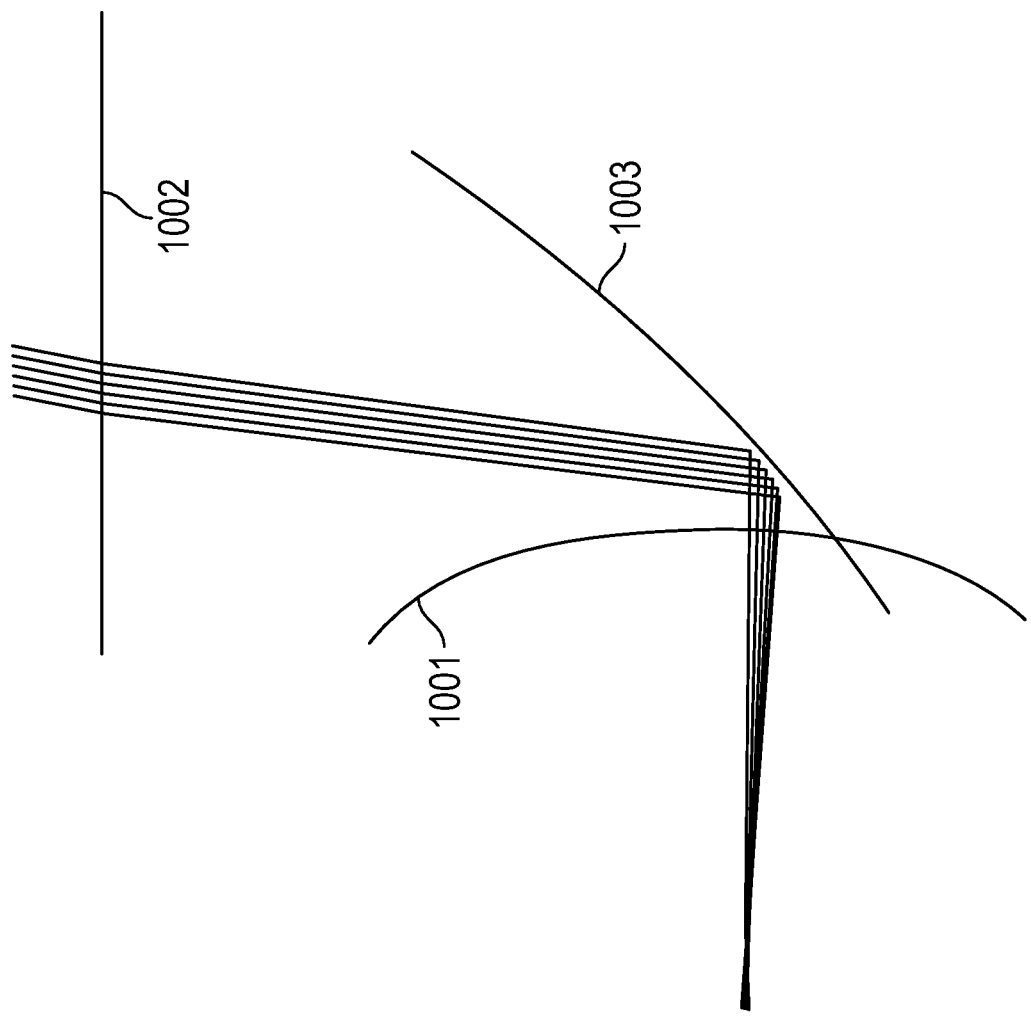
FIG. 10 depicts an ARHS optical system with multiple freeform surfaces arranged as a prism.
Figure 11:
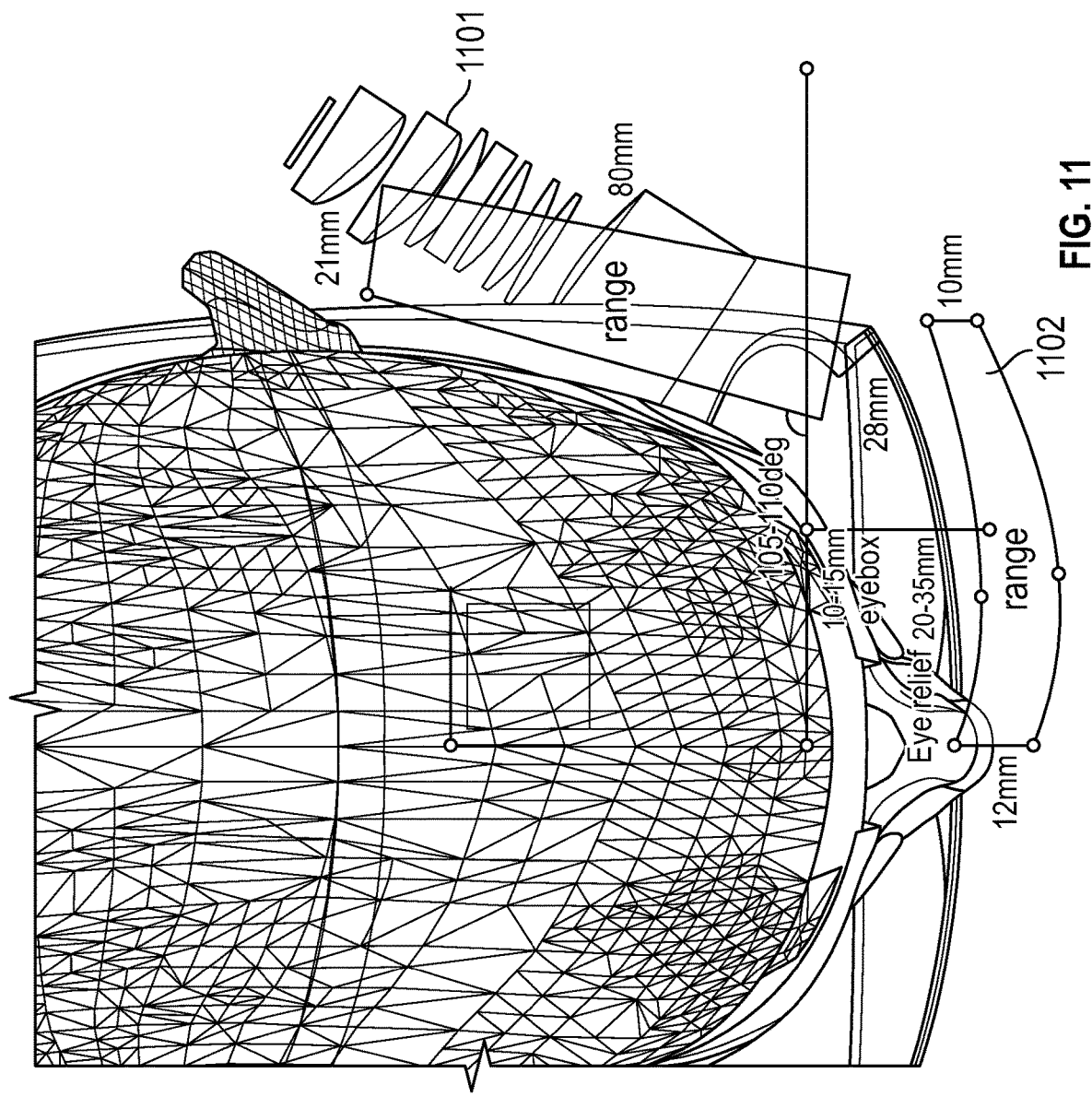
FIG. 11 depicts constraints used to optimize an ARHS system.
Figure 12:
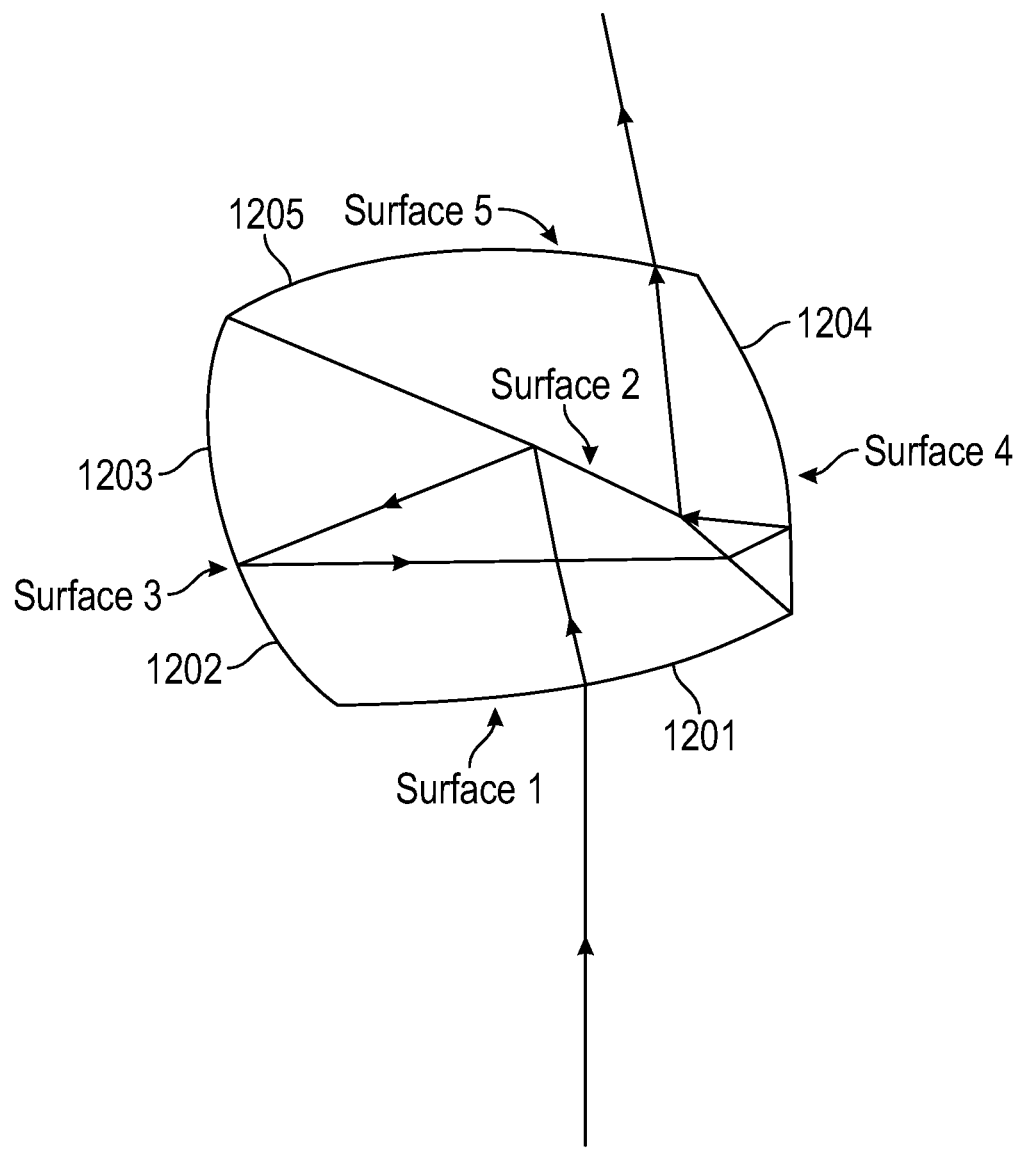
FIG. 12 depicts an ARHS optical system using a multipass cemented prism pair with freeform surfaces.
Figure 13:
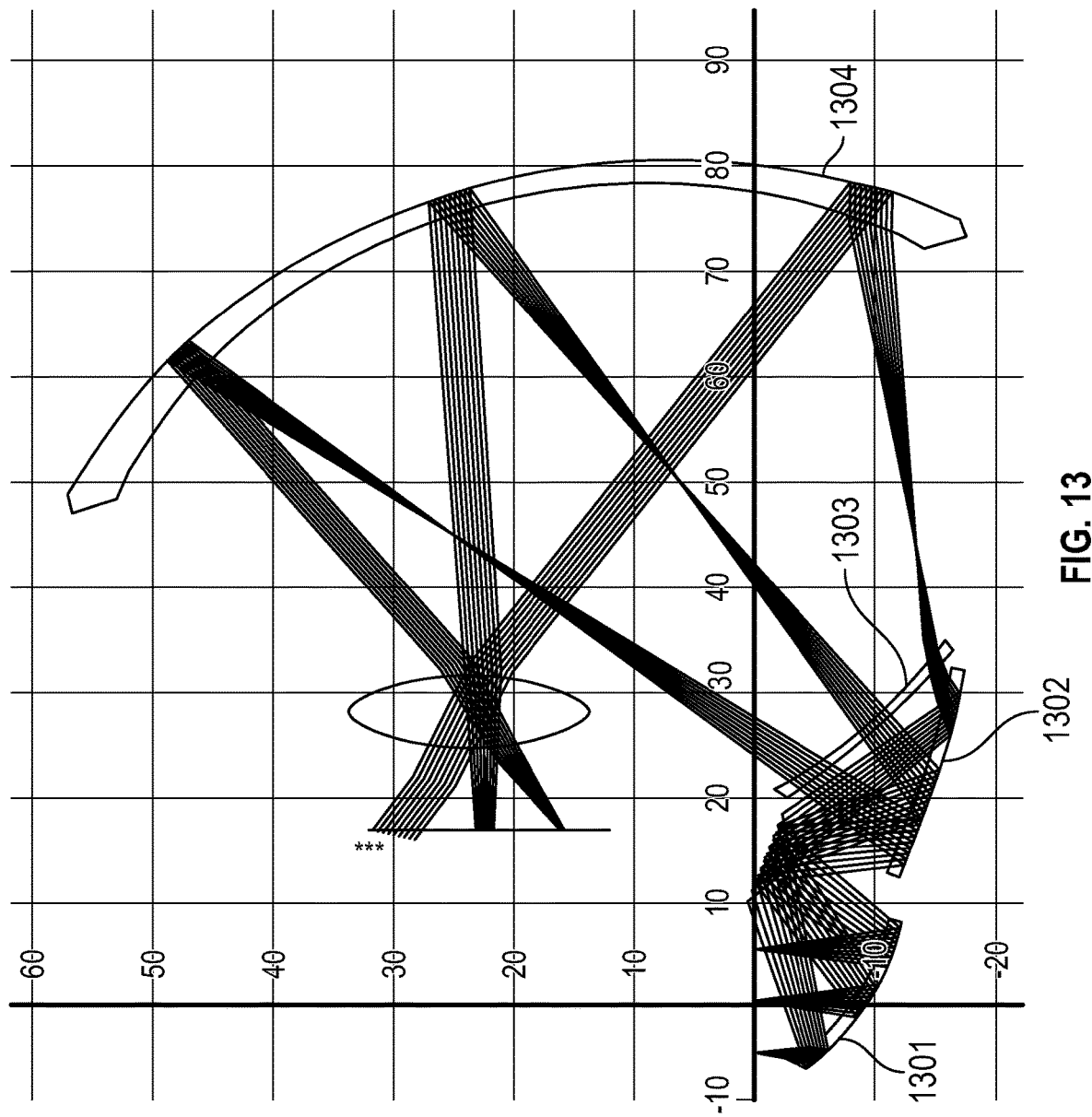
FIG. 13 depicts an ARHS optical system using multiple curved reflective surfaces.

FIG. 10-13 are additional features of the optical system. FIG. 10 depicts a system where light enters from a point source through freeform surface 1001, reflects off of freeform surface 1003, and exits as a collimated bundle of rays through freeform surface 1002. FIG. 12 depicts a system where light enters through freeform face 1201 of a cemented pair of freeform prisms, and after several reflections off of freeform surfaces 1202, 1203, 1204, and 1205 exits as a collimated bundle of light to the user's eye. FIG. 13 depicts a system where light from a point source reflects off of several freeform or aspheric mirrors 1301, 1302 before passing through one or more refractive elements 1303 and reflecting off Magnin mirror 1404 to the user's eye.

Figure 14:
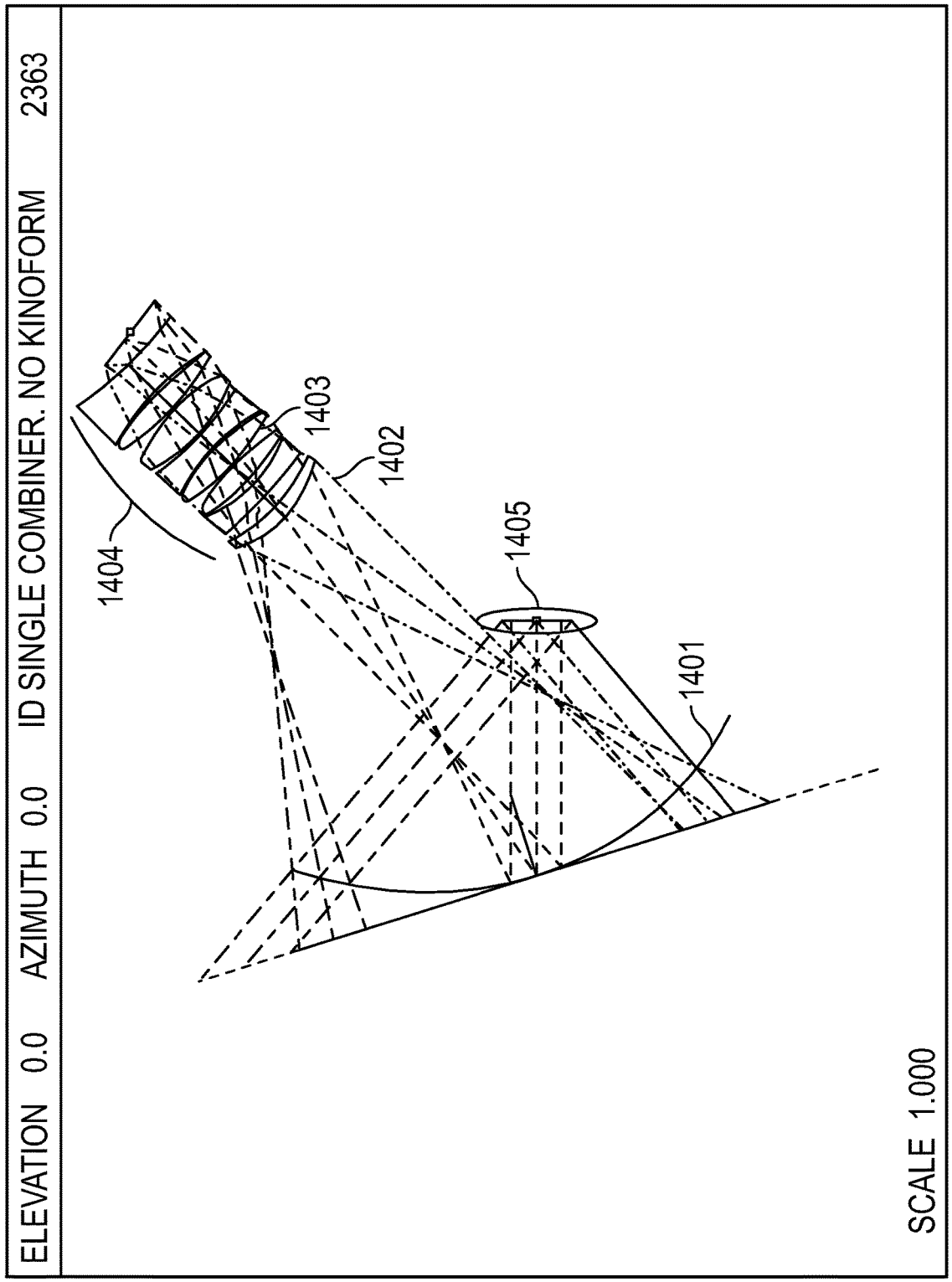
FIG. 14 depicts an exemplary ARHS optical system meeting certain design constraints.

FIG. 14 depicts an exemplary system. These systems include multiple freeform and aspheric surfaces 1401, 1402, 1403 which curvatures that can be (but are not limited to) polynomial, Zernike polynomial, or standard aspheric. These surfaces could very high order (50-100th order) surfaces. The imaging optics 1404 and combiner 1401 are generated, optimized, and toleranced together in order to meet the target performance and size requirements.

Figure 15:
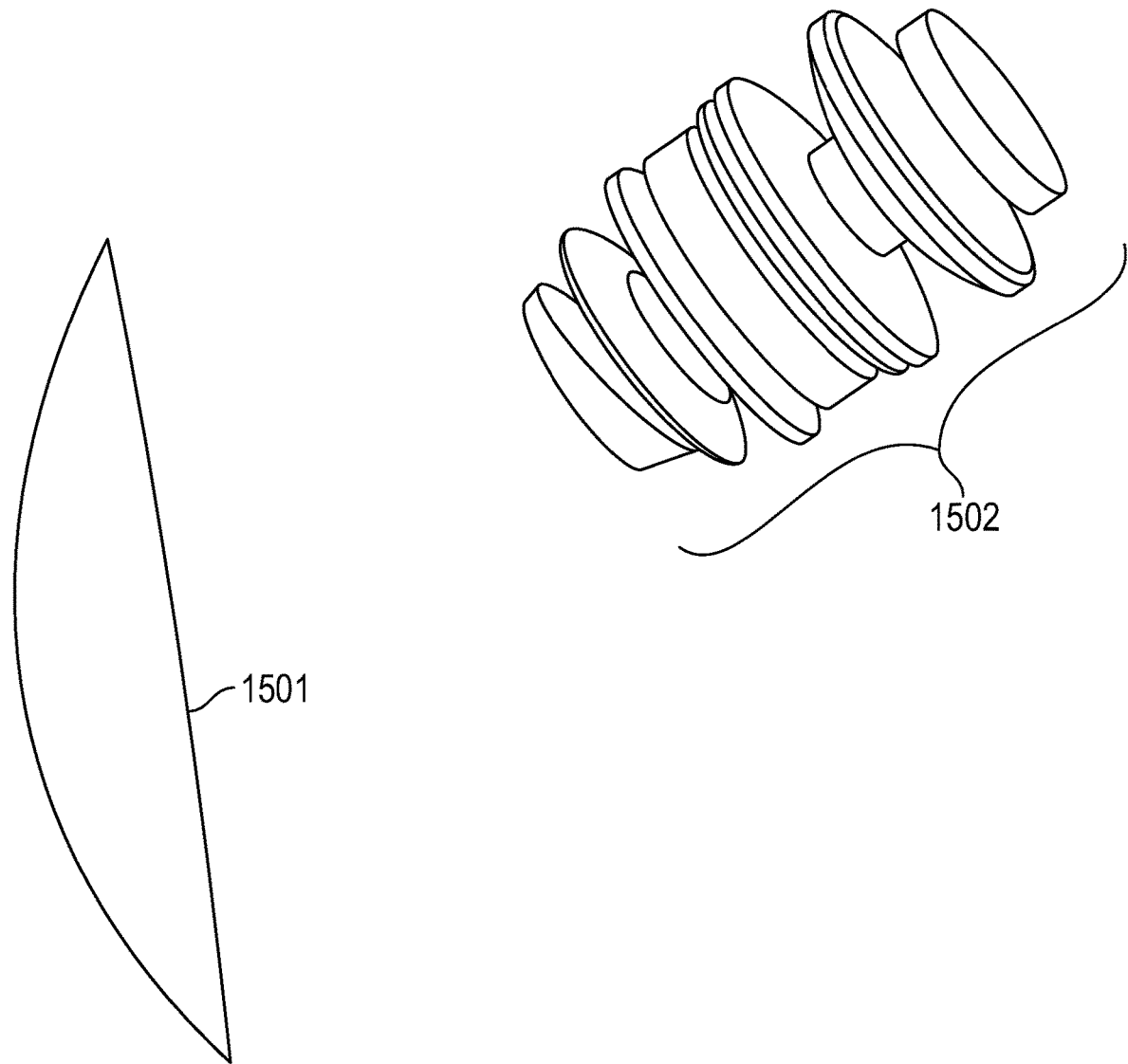
FIG. 15 depicts another view of the system in FIG. 14.
Figure 16:
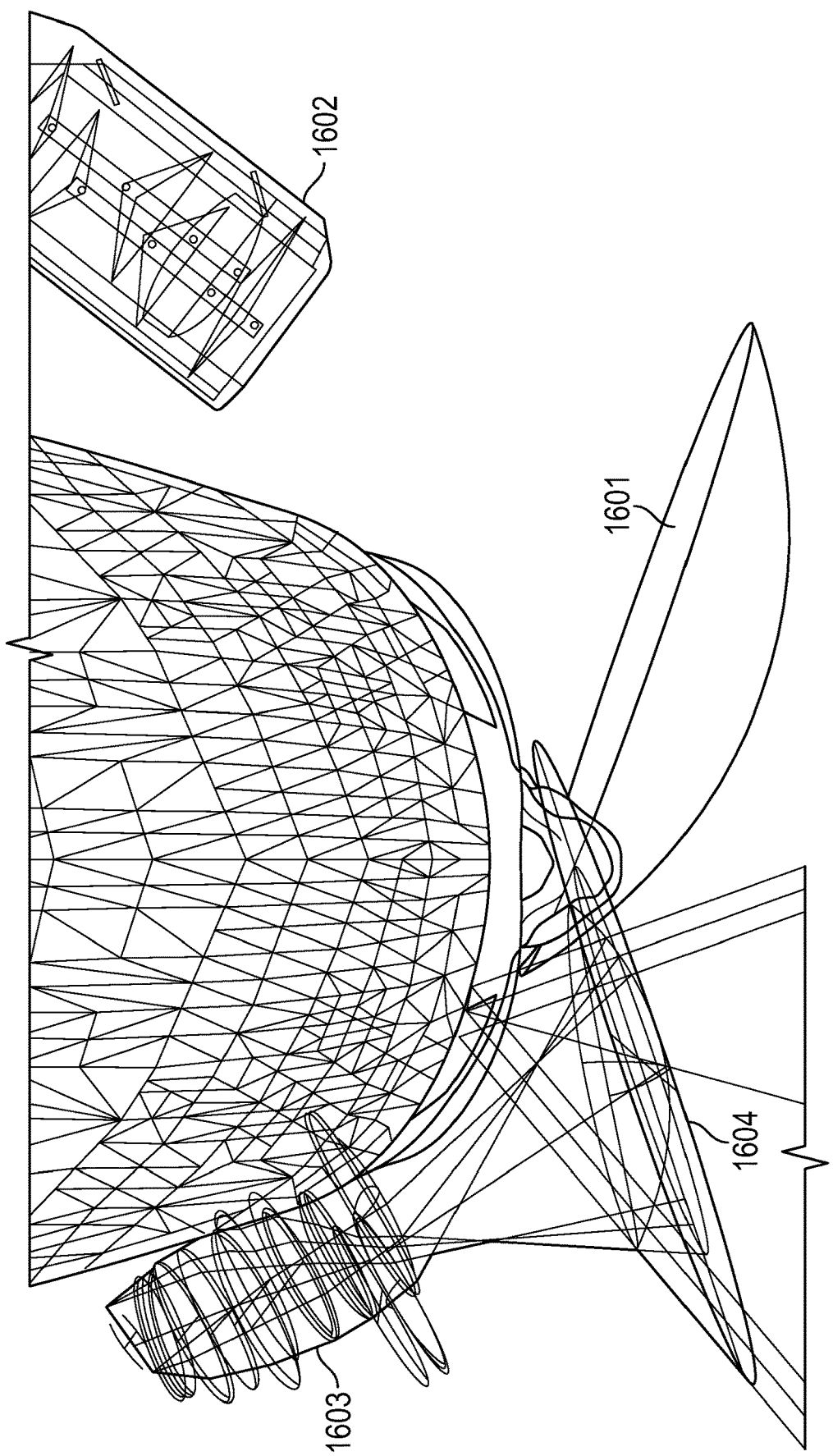
FIG. 16 depicts another exemplary ARHS optical system.
Figure 17:
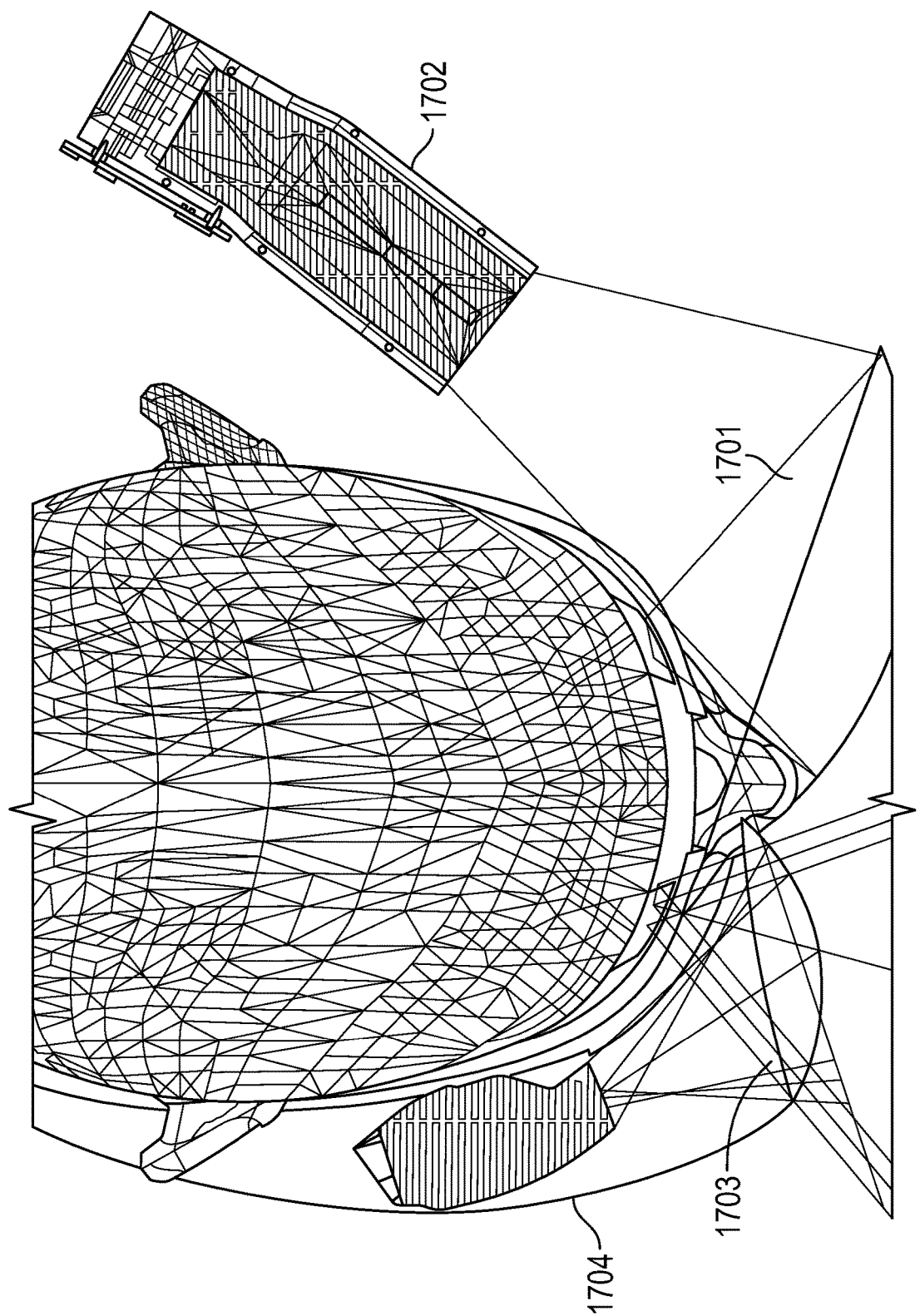
FIG. 17 depicts another exemplary ARHS optical system.

FIGS. 15-17 and 20 depict several additional exemplary systems. FIG. 15 depicts another view of the system in FIG. 14 showing combiner 1501 and imaging optics 1502. FIG. 16 depicts two more systems comprising combiner 1601 and imaging optics 1602 in one system, and combiner 1604 and imaging optics 1603 in another system. FIG. 17 depicts two more systems comprising combiner 1701 and imaging optics 1702 in one system, and combiner 1703 and imaging optics 1704 in another system.

Figure 18:
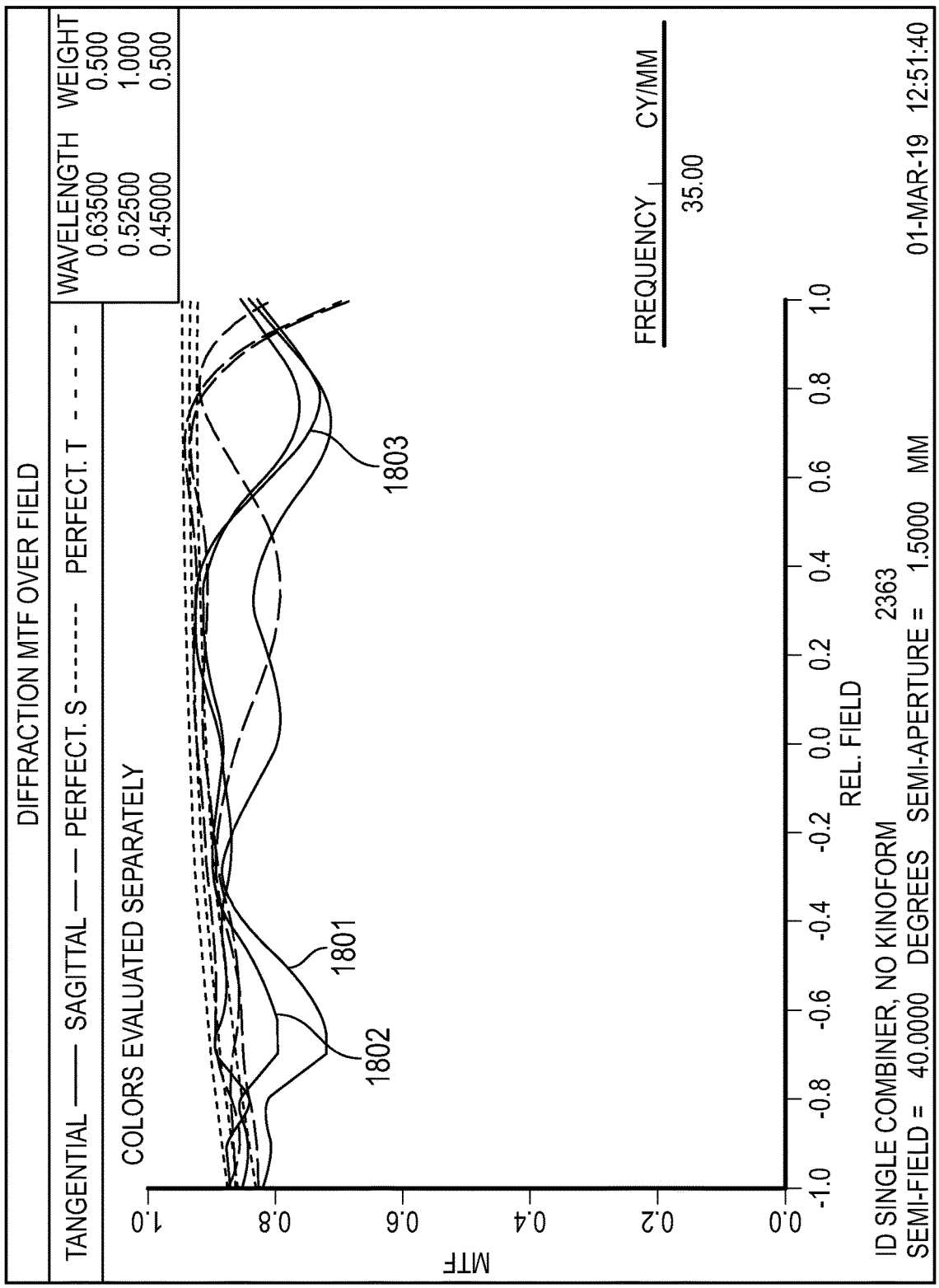
FIG. 18 depicts the MTF of an exemplary ARHS optical system.

FIG. 18 is a depiction of the modulation transfer function (MTF) of the exemplary system in FIG. 14. The MTF of this system at wavelengths of 635 nm, 525 nm, and 450 nm, 1801, 1802, and 1803, respectively, is over 0.8 at 35 cycles/mm. The MTF describes the resolution or sharpness of the optical system. A high MTF is advantageous as it allows the user to see more detail and read text more clearly; however, a high MTF can be difficult to achieve in a given size constraint. The present invention uses aspheric, Fresnel, and kinoform elements in an optimized configuration to achieve this performance.

Furthermore, the MTF depicted in FIG. 18 is achieved over an eyebox 1405 of at least 10 mm width. As eyebox size, which is equal to the size of the exit pupil of the system, increases, it becomes harder to maintain a high MTF. This is because several optical aberrations increase sharply with the pupil size. The aspheric, Fresnel, and kinoform elements are used to correct these aberrations and maintain a high MTF.

Figure 20:
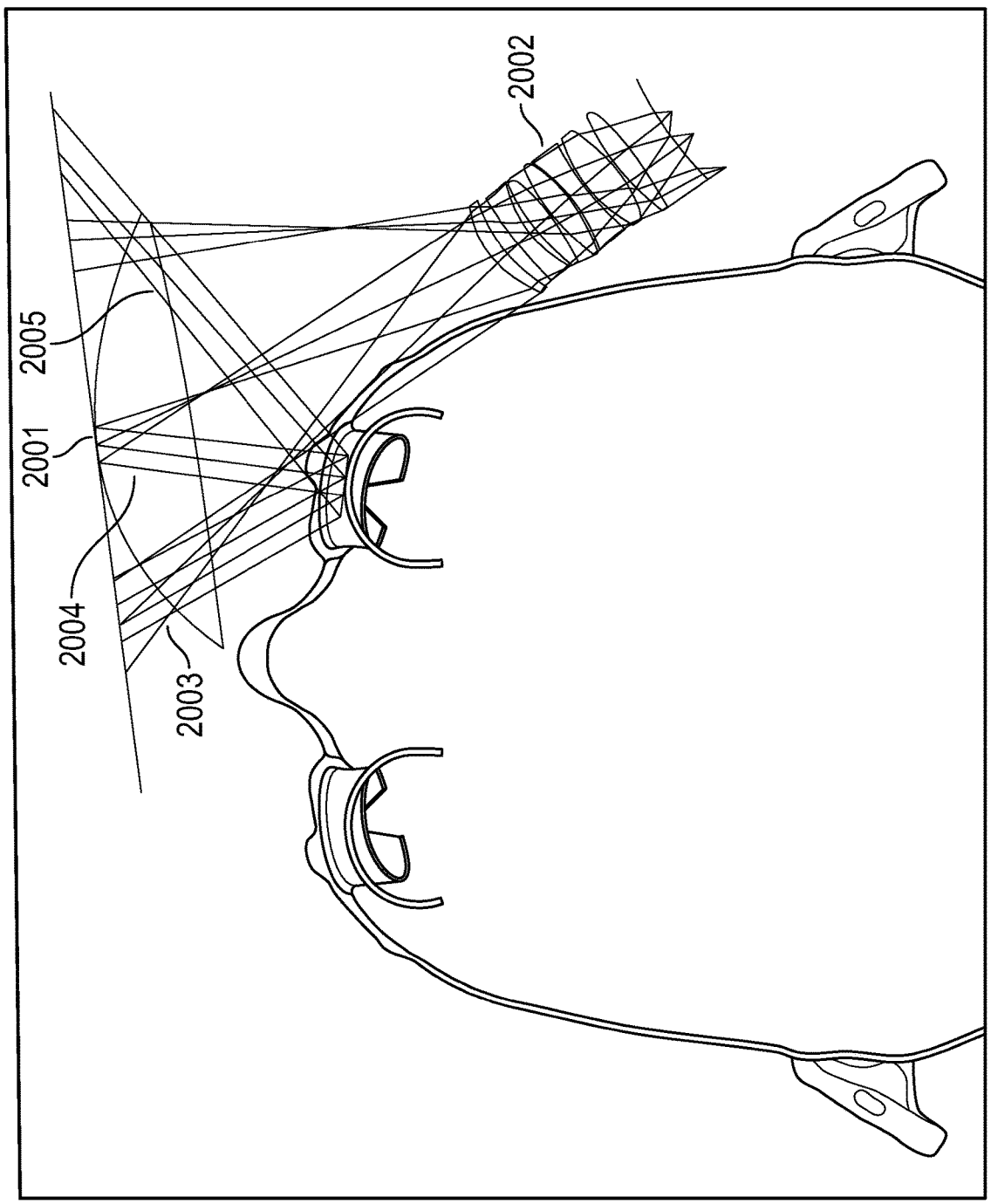
FIG. 20 depicts an exemplary ARHS optical system relative to a model of the user's head.

FIG. 20 depicts the exemplary system of FIG. 14 and FIG. 15 in relation to an exemplary user's head, showing combiner 2001, imager optics 2002, and light paths for 3 fields 2003, 2004, 2005.

Figure 21:
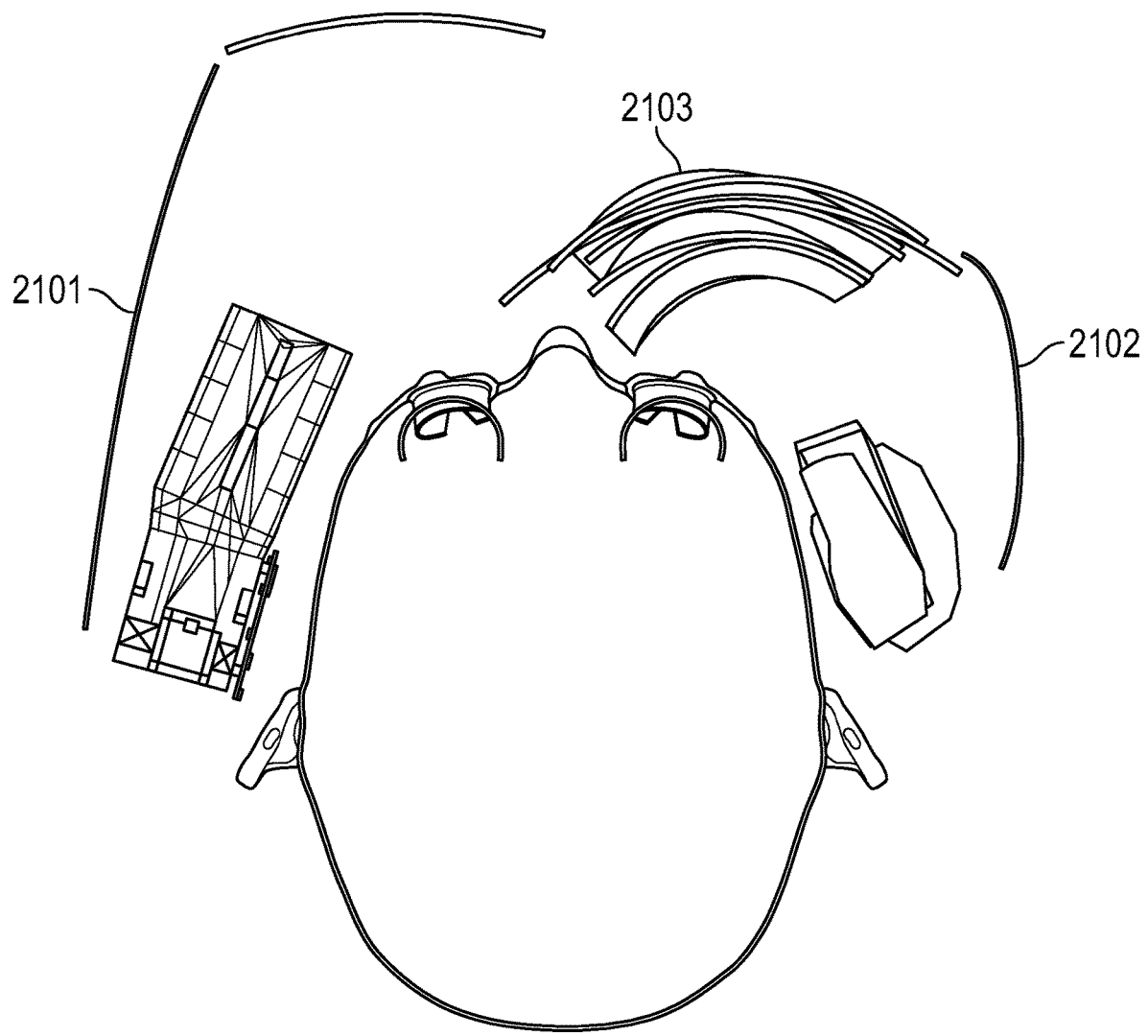
FIG. 21 depicts a comparison of the size of an ARHS optical system before and after optimization.

FIG. 21 depicts several exemplary systems. 2101 is a system prior to optimization; it uses spherical surfaces and has not been optimized for size. 2102 consists of a comparison of several variant systems after optimization. These optimized systems use high-order aspheric and freeform surfaces (up to, but not limited to, 66th-order) to achieve target size constraints around or under 25×25×55 mm. These aspheric and freeform surfaces are optimized to be manufactured from injection-moldable glasses or optical plastics in order to reduce cost, as ground or machined aspheric elements are prohibitively expensive for mass production and general prototyping.

Figure 22:
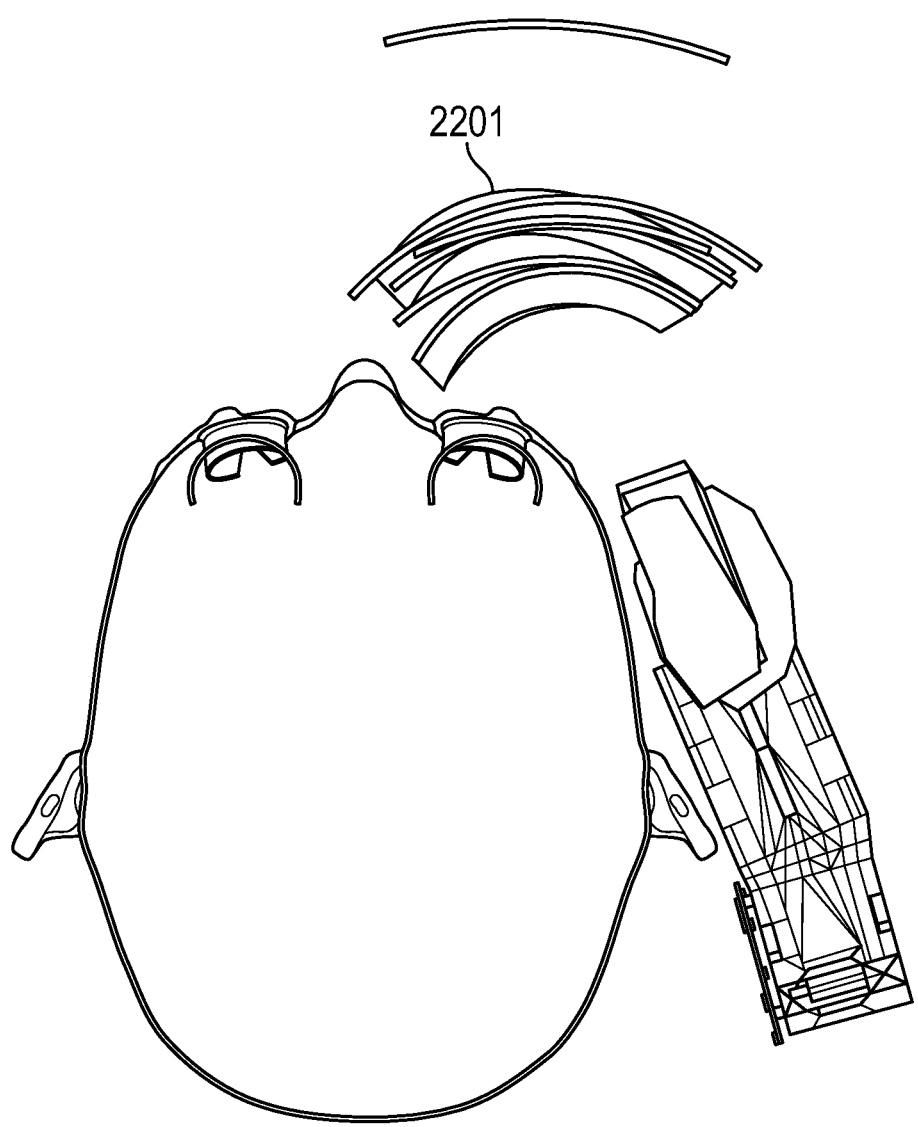
FIG. 22 depicts additional comparisons and variants of an ARHS optical system.
Figure 23:
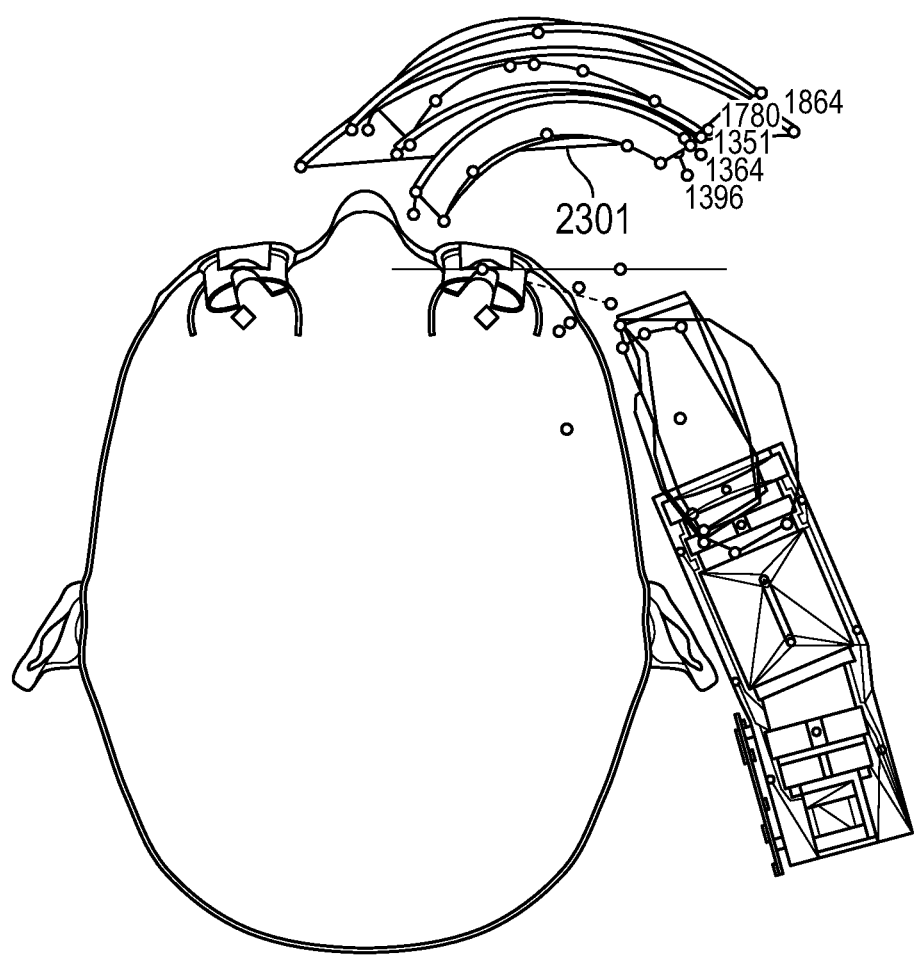
FIG. 23 depicts additional comparisons and variants of an ARHS optical system.

FIG. 22 and FIG. 23 depict several additional such comparisons and exemplary systems. In some of these systems, the combiner is a Magnin mirror 2103, 2201, 2301 where a partially reflective front surface and a transmissive rear surface act together to correct optical aberrations. In some of these systems, tilted and decentered lens elements have been used to bring the imaging optics closer to the wearers head, allowing a wide field-of-view to be achieved with an overall width under 220 mm. The tilt angle for any reflective, partially reflective, or Magnin mirror element could be positive or negative, as these elements may point in different directions. The tilt angle for these reflective, partially reflective, or Magnin mirror elements can be up to and including plus or minus 90 degrees with respect to the previous element. The tilt angle for any transmissive or diffractive element, starting at the image source, would generally be less than, but not limited to, plus or minus 30 degrees relative to the normal of that element.

Figure 24:
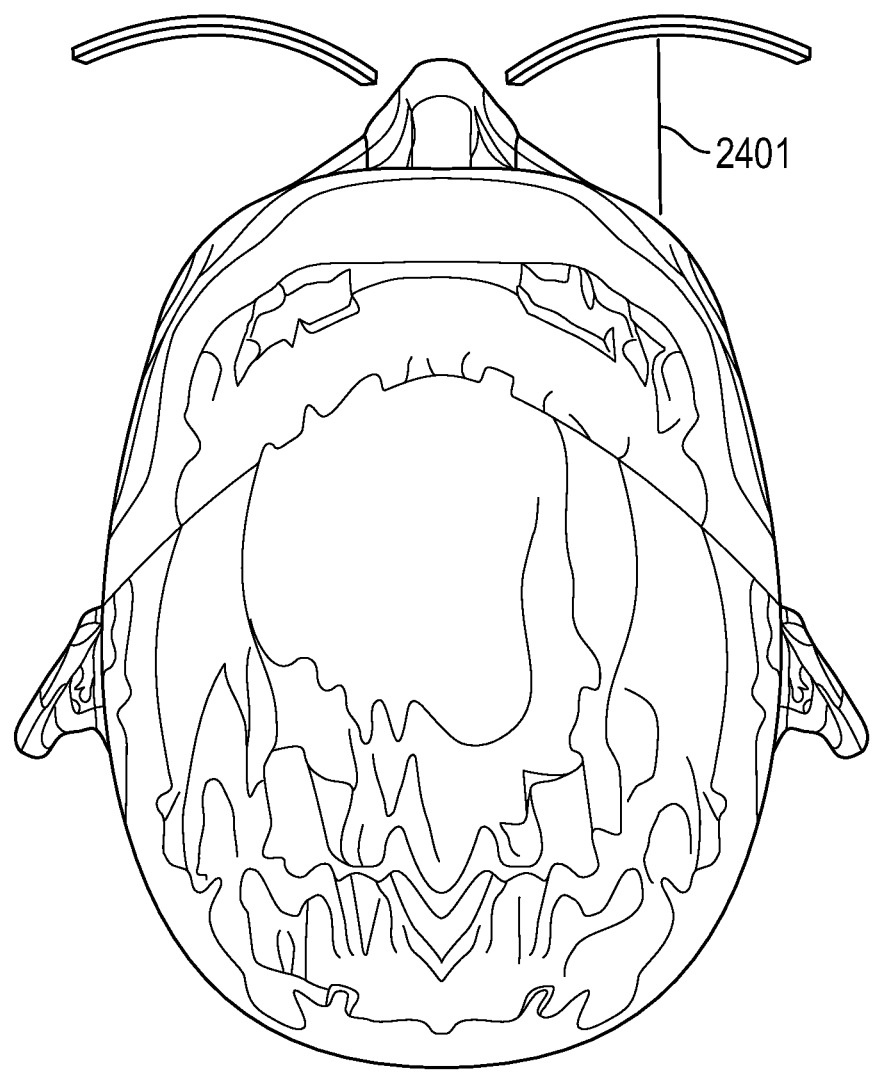
FIG. 24 depicts the eye relief on an exemplary ARHS optical system.

FIG. 24 depicts an exemplary system with 20-40 mm of eye relief 2401. Eye relief is the distance from the combiner to the user's eye; 20-40 mm allows the user to wear prescription eyeglasses under the ARHS while not adding excessive bulk to the system. Excessive eye relief can seriously affect the usability of the device by shifting the weight balance forwards, which can cause discomfort and neck strain during extended use. This 20-40 mm range for eye relief is determined from our iterative optimization process to be realizable with the rest of the optical system. This is an important system design constraint that is compatible with the other system design constraints, including but not limited to size, field-of-view, eyebox size, MTF, and manufacturability.

Figure 19:
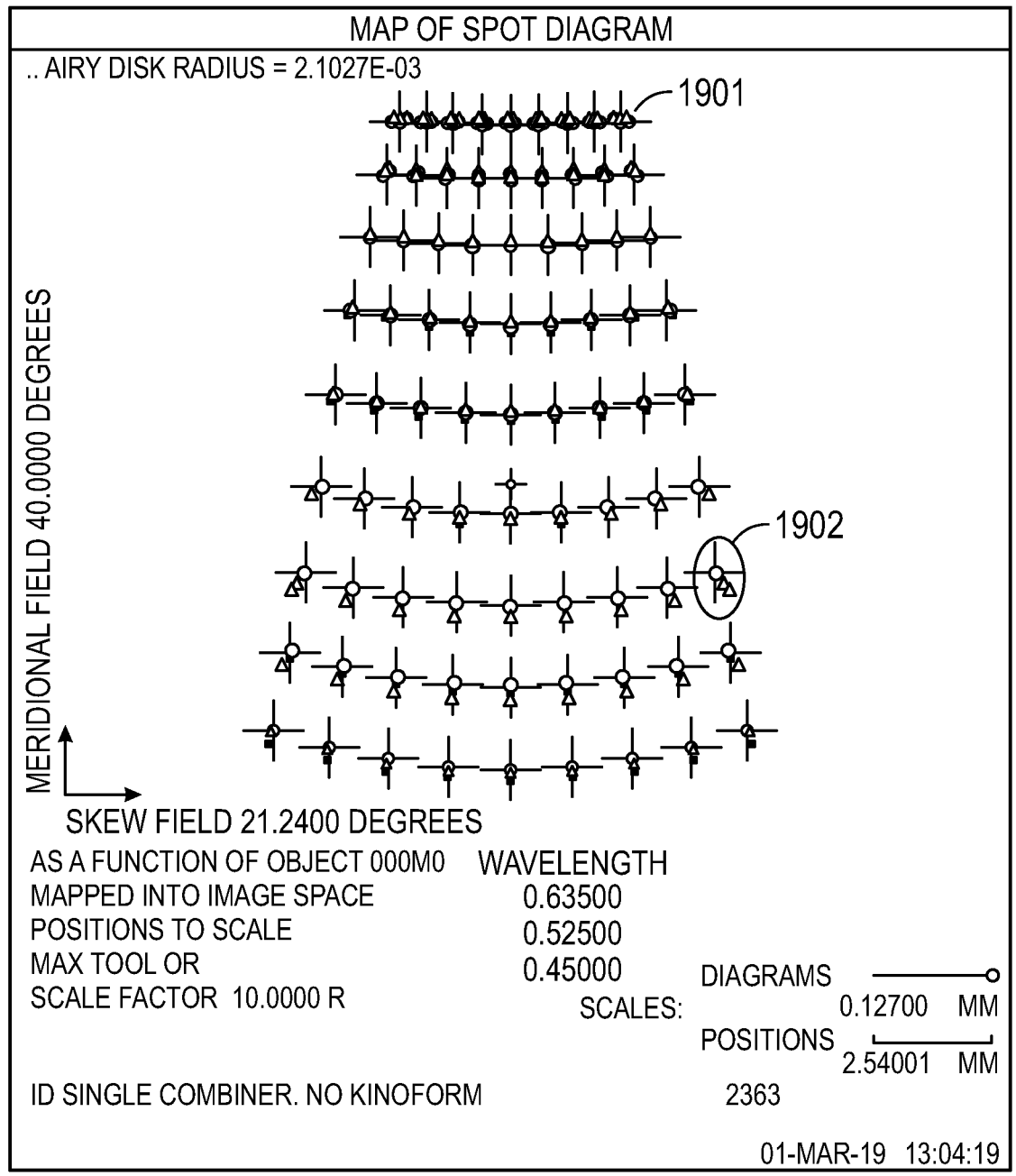
FIG. 19 depicts the spot diagram of an exemplary ARHS optical system.

FIG. 19 shows the spot diagram of an exemplary system, as determined by backwards ray-tracing from the eyebox to the image source. The maximum spot size 1901 is under 2 times the imager pixel pitch, which in this system is 10 micrometers. The spot diagram also indicates this system has geometric distortion which falls below thresholds determined by the resolution of the imager and the field-of-view of the system; this distortion can be corrected in software, which runs on the ARHS, the host computer, or a cloud-based service, by applying a spatially varying transformation to the image displayed on the image source opposite to that generated by the distortion.

FIG. 19 also indicates the exemplary system has lateral chromatic aberration 1902; the spots for different wavelengths do not overlap completely and their positions differ by 1-2 pixels. Lateral chromatic aberration occurs because the wavelength-dependence of refractive index causes the imaging optics to have different magnification for different wavelengths. In this system, lateral chromatic aberration is corrected in software, which runs on the ARHS, the host computer, or a cloud-based service, by scaling the red, green, and blue imaging channels differently and oppositely to the difference in magnification caused by the aberrations. The optimization process preferentially minimizes longitudinal chromatic aberration over lateral chromatic aberration; longitudinal chromatic aberration is a defocusing effect which causes loss of information and as such is difficult to correct in software.

Due to diffraction and various optical aberrations, the exemplary system in FIG. 19 has spot size which is greater than the pixel pitch of the imager. To improve the perceived quality of the image, perceptually-aware algorithms (such as edge detection or an unsharp mask) may be used in software running on the ARHS, the host computer, or a cloud-based surface, to sharpen the images displayed on the imager. Deconvolution algorithms may also be used to the same effect.

An ARHS overlays virtual content on the real world. As such, the appearance of the images, as perceived by the wearer, could change depending on the content and the environment. External sensors, in conjunction with software running on the ARHS, the host computer, or a cloud-based surface, could be used to perform content and environment aware adjustments (including, but not limited to, brightness, contrast, and color corrections), in order to improve the comfort and quality for the user.

FIG. 11 depicts a set of geometric constraints used to optimize an exemplary system. In these constraints, the permitted tilt of the imaging optics module 1101 is illustrated as ranging from 105 to 110 degrees relative to a plane that would be parallel to the front of the user or perpendicular to a plane passing from the center of the user's face to the center of the back of the user's head. Further, the permitted distance of the combiner 1102 from the user's eye (eye relief) is illustrated as ranging from 20-35 mm. The dimensional limits of the combiner 1102 is shown as range from 10 mm to 12 mm. Automatic design software, using these constraints, operates to optimize a system which satisfies the needs of the ARHS.

In constructing the ARHS, two optical systems can be used, one for each eye to create the monocular areas with the overlap being binocular. With the micro OLED and the employment of the Fresnel lens technology, the optical systems can be small and lightweight. An added advantage is that the elements of the optical system can be created with injection molding, thus further reducing the cost of manufacture.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A projection augmented reality headset (ARHS) comprising;
   an imager configured to provide image light;
   a partially reflecting combiner, configured to receive the image light from the imager and upon receiving the image light is configured to re-direct the image light towards an eyebox, wherein an eye relief offset exists between the partially reflecting combiner and the eyebox;
   wherein the imager includes imaging optics comprising a combination of lens elements having symmetrical freeform lens surfaces that are tilted and decentered, whereby an expanded field-of-view can be attained while providing the eye relief offset.

2. The ARHS of claim 1, wherein the field-of-view is at least 65 degrees horizontally per eye.

3. The ARHS of claim 1, wherein the eyebox is at least 10 mm wide horizontally and vertically.

4. The ARHS of claim 1, wherein the imager has a pixel pitch between 0.5 and 15 micrometers.

5. The ARHS of claim 4, wherein the maximum linear dimension of the imager is between 0.1 and 3.5 inches.

6. The ARHS of claim 1, wherein the field-of-view is at least 65 degrees horizontally per eye and the eyebox is at least 10 mm wide horizontally and vertically, and further wherein a modulation transfer function ("MTF") does not fall below thresholds related to the pixel pitch of the imager across the field-of-view and the eyebox.

7. The ARHS of claim 1, wherein the imaging optics comprise refractive lens elements that are fabricated from materials compatible with one or more processes selected from the group of processes including: injection-molded, ground, or machined.

8. The ARHS of claim 1, wherein a computer-aided automatic process is utilized to generate, optimize and set tolerances for the imaging optics and combiner based on a single system of constraints.

9. The imaging optics of claim 1, wherein a longitudinal chromatic aberration is sufficiently low such that a photopically-weighted polychromatic MTF does not fall below thresholds related to the pixel pitch of the imager.

10. The ARHS of claim 1, further comprising a software application configured to compensate for blur, distortion, and lateral chromatic aberration, whereby the image quality of the display is improved.

11. The ARHS of claim 1, further comprising a software application configured to adjust color and brightness according to image content and environmental conditions, whereby the comfort and quality can be improved for the user.

12. A projection augmented reality headset (ARHS) comprising;
an imager configured to provide image light;
a partially reflecting combiner, configured to receive the image light from the imager and upon receiving the image light is configured to re-direct the image light towards an eyebox, wherein an eye relief offset exists between the partially reflecting combiner and the eyebox;
wherein the imager includes imaging optics comprising a combination of lens elements having symmetrical free-form lens surfaces that are tilted and decentered, whereby an expanded field-of-view can be attained while providing the eye relief offset and wherein the partially reflecting combiner is positioned such that the eye relief offset is at least 20 mm, but no more than 40 mm.

13. The ARHS of claim 12, wherein the partially reflecting combiner comprises a rear surface, which is a partially reflective spherical, conic, aspheric, or freeform surface, and a front surface, which is a transmissive spherical, conic, aspheric, or freeform surface.

14. The ARHS of claim 12, wherein a partially reflective coated front surface, and the transmissive rear surface may be used together as a Magnin mirror to correct aberrations.

15. The ARHS of claim 12, wherein the combiner may consist of two cemented elements with a partially reflective second surface.

16. A projection augmented reality headset (ARHS) comprising;
an imager configured to provide image light;
a partially reflecting combiner, configured to receive the image light from the imager and upon receiving the image light is configured to re-direct the image light towards an eyebox, wherein an eye relief offset exists between the partially reflecting combiner and the eyebox;
wherein the imager includes imaging optics comprising a combination of lens elements having symmetrical free-form lens surfaces that are tilted and decentered, whereby an expanded field-of-view can be attained while providing the eye relief offset, wherein the imaging optics comprise a combination of spherical, aspherical, and free-form lens surfaces fabricated from plastic or glass.

17. The ARHS of claim 16, wherein the combiner includes tilted and/or decentered lens elements to reduce the peak width of the headset to no more than 220 mm while maintaining the wide field-of-view.

18. The ARHS of claim 16, wherein the lens elements are selected from one or more of a group of lens element types including: Fresnel, diffractive and kinoform lens elements, whereby the size and weight of the system can be reduced.

19. The ARHS of claim 16, wherein the lens elements are selected from one or more of a group of lens element types including: diffractive and kinoform lens elements, whereby compensation is obtained for the dispersion created by refractive elements.

20. A method for providing a wide field-of-view in a projection augmented reality headset (ARHS), the method comprising;
utilizing an imager to provide image light;
receiving the image light at a partially reflecting combiner;
the partially reflecting combiner re-directing the image light towards an eyebox, wherein an eye relief offset exists between the partially reflecting combiner and the eyebox; and
employing imaging optics comprising a combination of lens elements that are tilted and decentered, such that a field-of-view that is at least 65 degrees horizontally per eye can is created while providing the eye relief offset.

* * * * *